(12) United States Patent
Lei et al.

(10) Patent No.: US 10,099,194 B2
(45) Date of Patent: Oct. 16, 2018

(54) MICROCAPSULES PRODUCED FROM BLENDED SOL-GEL PRECURSORS AND METHOD FOR PRODUCING THE SAME

(75) Inventors: Yabin Lei, Holmdel, NJ (US); Lewis Michael Popplewell, Morganville, NJ (US); Xiao Huang, Freehold, NJ (US); Carol Joyce, Toms River, NJ (US)

(73) Assignee: INTERNATIONAL FLAVORS & FRAGRANCES INC., New York, NY (US)

( * ) Notice: Subject to any disclaimer, the term of this patent is extended or adjusted under 35 U.S.C. 154(b) by 118 days.

(21) Appl. No.: 13/422,090

(22) Filed: Mar. 16, 2012

(65) Prior Publication Data

US 2012/0237578 A1     Sep. 20, 2012

Related U.S. Application Data

(60) Provisional application No. 61/453,977, filed on Mar. 18, 2011.

(51) Int. Cl.
| | |
|---|---|
| *B01J 13/02* | (2006.01) |
| *B01J 13/18* | (2006.01) |
| *B01J 13/20* | (2006.01) |
| *C11D 3/50* | (2006.01) |
| *C11D 17/00* | (2006.01) |

(52) U.S. Cl.
CPC ............ *B01J 13/18* (2013.01); *B01J 13/206* (2013.01); *C11D 3/505* (2013.01); *C11D 17/0039* (2013.01)

(58) Field of Classification Search
CPC ...... B01J 13/18; B01J 13/206; B01J 20/3204; B01J 13/02; C11D 17/0039; C11D 3/505; A61K 47/48861; A61K 8/11; A61K 8/25
See application file for complete search history.

(56) References Cited

U.S. PATENT DOCUMENTS

| | | | |
|---|---|---|---|
| 4,081,384 A | 3/1978 | Pracht | 510/523 |
| 4,234,627 A | 11/1980 | Schilling | 8/137 |
| 4,605,554 A | 8/1986 | Prussin et al. | |
| 5,112,688 A | 5/1992 | Michael | 428/402.2 |
| 5,145,842 A | 9/1992 | Driedger et al. | 514/63 |
| 5,176,903 A | 1/1993 | Goldberg et al. | |
| 5,492,870 A * | 2/1996 | Wilcox et al. | 501/80 |
| 6,194,375 B1 | 2/2001 | Ness et al. | 512/4 |

(Continued)

FOREIGN PATENT DOCUMENTS

| | | |
|---|---|---|
| EP | 0478326 A1 | 4/1992 |
| EP | 1627573 A1 | 2/2006 |

(Continued)

OTHER PUBLICATIONS

O'Sullivan et al., Langmuir, 25: 7962-7966 (2009).*

(Continued)

*Primary Examiner* — Lakshmi S Channavajjala
(74) *Attorney, Agent, or Firm* — Martin Zhang; XuFan Tseng; Elizabeth M. Stover

(57) ABSTRACT

The present invention features microcapsule particles with an oil or aqueous liquid core, and shell composed of a blend of metal or semi-metal oxide polymers. Methods for preparing and using the microcapsule particles in personal care, therapeutic, cosmetic and cosmeceutic products are also provided.

35 Claims, 7 Drawing Sheets

(56) References Cited

U.S. PATENT DOCUMENTS

| | | |
|---|---|---|
| 6,238,650 B1 | 5/2001 | Lapidot et al. .................. 424/59 |
| 6,248,703 B1 | 6/2001 | Finucane et al. ............. 510/152 |
| 6,303,149 B1 | 10/2001 | Magdassi et al. ............ 424/489 |
| 6,329,057 B1 | 12/2001 | Dungworth et al. ......... 428/403 |
| 6,337,089 B1 | 1/2002 | Yoshioka et al. ............. 424/451 |
| 6,537,583 B1 * | 3/2003 | Dupuis et al. ................. 424/490 |
| 6,855,335 B2 | 2/2005 | Seok et al. .................... 424/489 |
| 7,112,339 B1 * | 9/2006 | Ahola et al. ................... 424/484 |
| 7,147,915 B2 | 12/2006 | Kawai et al. |
| 7,758,888 B2 | 7/2010 | Lapidot et al. ............... 424/489 |
| 2002/0064541 A1 | 5/2002 | Lapidot et al. |
| 2003/0082276 A1 | 5/2003 | Subramaniam et al. |
| 2004/0175404 A1 | 9/2004 | Shefer et al. |
| 2005/0153135 A1 | 7/2005 | Popplewell et al. |
| 2005/0265938 A1 | 12/2005 | Cohen et al. |
| 2006/0256748 A1 | 11/2006 | Jung et al. |
| 2007/0051274 A1 * | 3/2007 | Saito et al. ................. 106/287.1 |
| 2007/0078071 A1 | 4/2007 | Lee et al. |
| 2007/0190325 A1 * | 8/2007 | Berg-Schultz ........... A61K 8/11 428/402.21 |
| 2007/0227398 A1 | 10/2007 | Lee et al. |
| 2008/0317795 A1 * | 12/2008 | Traynor ................. A61K 8/062 424/401 |
| 2009/0004418 A1 * | 1/2009 | Takaki et al. .............. 428/36.92 |
| 2009/0047230 A1 * | 2/2009 | Caballero et al. ........... 424/70.2 |
| 2009/0025361 A1 | 10/2009 | Mushock et al. |
| 2009/0246279 A1 * | 10/2009 | Kong et al. .................... 424/486 |
| 2010/0143422 A1 | 6/2010 | Popplewell et al. |
| 2012/0107499 A1 * | 5/2012 | Traynor .................. A61K 8/11 427/213.31 |

FOREIGN PATENT DOCUMENTS

| | | | |
|---|---|---|---|
| EP | 2025364 A2 | 2/2009 | |
| EP | 2196257 A2 | 6/2010 | |
| EP | 2500087 A2 | 9/2012 | |
| FR | 2703927 A1 | 10/1994 | |
| FR | 2780901 A1 | 1/2000 | |
| GB | 2416524 A | 2/2006 | |
| WO | WO94/04260 | 3/1994 | |
| WO | WO94/04261 | 3/1994 | |
| WO | WO99/03450 | 1/1999 | |
| WO | 03/034979 A2 | 5/2003 | |
| WO | 03066209 A1 | 8/2003 | |
| WO | WO-2008047248 A2 * | 4/2008 | ............. A61K 8/416 |
| WO | 2008144734 A1 | 11/2008 | |
| WO | WO 2009106318 A2 * | 9/2009 | |
| WO | 2011003805 A2 | 1/2011 | |
| WO | 2011124706 A1 | 10/2011 | |
| WO | 2011161265 A2 | 12/2011 | |
| WO | 00/09652 A2 | 9/2012 | |
| WO | 2013092958 A1 | 6/2013 | |

OTHER PUBLICATIONS

Flick, Cosmetic Additives, Noyes Publications, (1991) p. 194.*
"Non-Defatting Body Wash", Cosmetic & Toiletry Formulations 2nd Ed. vol. 2, Flick, Ed. p. 99 (1992).*
Hofer et al., Langmuir, 14: 4014-4020 (2001).*
Extended European Search Report dated May 13, 2015 from European Patent Office for Application No. 12159991.4, filed Mar. 16, 2012.
Extended European Search Report dated Sep. 25, 2015 from European Patent Office for Application No. 14189395.8, filed Oct. 17, 2014.
EPO Examination Report dated Nov. 24, 2016 for Application No. EP 12159991.4.
MX office action dated Mar. 31, 2017 for Application No. MX/a/2012/003321 and English translation.
BASF publication, title: PVP and More . . . Luvitec, Luvicross and Clooacral Val versitle specialty polymers for technical applications, download from http://www.micronal.de/portal/streameron Aug. 6, 2014, published Apr. 2009.
Larsson et al., Annual Transactions of the Nordic Rheology Society, vol. 20 (2012).
European Search Report. EP14189284. International Flavors & Fragrances Inc. dated Feb. 2, 2015.
Mamoru Aizawa Aizawa et al. 2000. Preparation of Spherical Hydrous Silica Oxide Particles under Acidic Condition via Sol-Gel Processing. Journal of Sol-Gel Science and Technology. 19:329-332.
Office Communication dated Mar. 15, 2012 from U.S. Appl. No. 12/328,340, filed Dec. 4, 2008.
Office Communication dated Dec. 16, 2012 from U.S. Appl. No. 12/793,911, filed Jun. 4, 2010.
Office Communication dated May 9, 2013 from U.S Appl. No. 12/793,911, filed Jun. 4, 2010.
Chinese SIPO Decision on Rejection dated Jan. 20, 2017 for Application No. CN201210157187.7.

* cited by examiner

MICROCAPSULES PRODUCED FROM BLENDED SOL-GEL PRECURSORS AND METHOD FOR PRODUCING THE SAME

This patent application claims the benefit of priority from U.S. Provisional Application Ser. No. 61/453,977 filed Mar. 18, 2011, the content of which is incorporated herein by reference in its entirety.

INTRODUCTION

Background of the Invention

Fragrance chemicals are used in numerous products to enhance the consumer's enjoyment of a product. Fragrance chemicals are added to consumer products such as laundry detergents, fabric softeners, soaps, detergents, personal care products, such as but not limited to shampoos, body washes, deodorants and the like, as well as numerous other products.

In order to enhance the effectiveness of the fragrance materials for the user, various technologies have been employed to enhance the delivery of the fragrance materials at the desired time. One widely used technology is encapsulation of the fragrance material in a protective coating. Frequently the protective coating is a polymeric material. The polymeric material is used to protect the fragrance material from evaporation, reaction, oxidation or otherwise dissipating prior to use. A brief overview of polymeric encapsulated fragrance materials is disclosed in the following U.S. Pat. No. 4,081,384 discloses a softener or anti-stat core coated by a polycondensate suitable for use in a fabric conditioner. U.S. Pat. No. 5,112,688 discloses selected fragrance materials having the proper volatility to be coated by coacervation with microparticles in a wall that can be activated for use in fabric conditioning. U.S. Pat. No. 5,145,842 discloses a solid core of a fatty alcohol, ester, or other solid plus a fragrance coated by an aminoplast shell. U.S. Pat. No. 6,248,703 discloses various agents including fragrance in an aminoplast shell that is included in an extruded bar soap.

FR 2780901, WO 99/03450, FR 2703927, WO 94/04260 and WO 94/04261 further disclose microparticles and nanoparticles for encapsulation of cosmetics, pharmaceutics and food compositions, which include cell walls that are formed by cross-linking of organic and bio-organic polymers.

While encapsulation of fragrance in a polymeric shell can help prevent fragrance degradation and loss, it is often not sufficient to significantly improve fragrance performance in consumer products. Therefore, methods of aiding the deposition of encapsulated fragrances have been described. U.S. Pat. No. 4,234,627 describes a liquid fragrance coated with an aminoplast shell further coated by a water insoluble meltable cationic coating in order to improve the deposition of capsules from fabric conditioners. U.S. Pat. No. 6,194,375 suggests the use of hydrolyzed polyvinyl alcohol to aid deposition of fragrance-polymer particles from wash products. U.S. Pat. No. 6,329,057 describes the use of materials having free hydroxy groups or pendant cationic groups to aid in the deposition of fragranced solid particles from consumer products.

In addition, the prior art describes the use of silica to form microcapsule formulations specifically designed to prevent an encapsulated active ingredient from leaving the microcapsule. This is desirable when the active ingredient is an irritant to the body tissue to which it is applied. It is also is desired when the active ingredient acts by interaction with light, such as sunlight. See U.S. Pat. No. 6,303,149 and U.S. Pat. No. 6,238,650. However, these references fail to teach compositions and methods for releasing and hence delivering the active ingredients. Moreover, while U.S. Pat. Nos. 6,337,089; 6,537,583; 6,855,335; and 7,758,888 describe inorganic capsules containing a core with an active ingredient, these references do no teach modifications that enhance performance.

Accordingly, there is an ongoing need for the improved delivery of fragrance materials for various personal care products, rinse-off products and leave-on products that provide improved performance.

SUMMARY OF THE INVENTION

The present invention is a microcapsule particle composition composed of (a) a core formed from an oil or aqueous liquid containing at least one active ingredient; and (b) a shell encapsulating said core, wherein said shell is composed of (i) at least one hydrolyzable metal or semi-metal oxide polymer, and (ii) at least one metal or semi-metal oxide polymer having a non-hydrolyzable substituent, wherein the non-hydrolyzable metal or semi-metal oxide polymer is present in an amount up to 10% of the total weight of the shell and optionally (c) a surfactant or polymer. In one embodiment, the metal of the at least one hydrolyzable metal or semi-metal oxide polymer and at least one non-hydrolyzable metal or semi-metal oxide polymer is aluminum, silicon, zirconium or a transition metal. In another embodiment, the surfactant or polymer is a phosphate ester surfactant or polymer. The term surfactant and polymer are often used interchangeably by those skilled in the art as the molecular weight cutoff is normally loosely defined. A personal care, therapeutic, cosmetic or cosmeceutic product containing the microcapsule particle of the invention is also provided.

The present invention also features processes for the preparation of microcapsule particles containing an oil or aqueous liquid core. In one embodiment, a first emulsion containing an oil or aqueous liquid is combined with a mixture of (i) at least one hydrolyzable sol-gel precursor and (ii) at least one sol-gel precursor having at least one non-hydrolyzable substituent, wherein the at least one sol-gel precursor having at least one non-hydrolyzable substituent is present in an amount of up to 10% of the total sol-gel precursor of (ii); and the combination is cured to prepare the instant microcapsule particles and (iii) the phosphate ester surfactant is further added after step (ii) to produce the microcapsule system.

In another embodiment, the method involves mixing, in a sol-gel process (i) a first emulsion containing an oil or aqueous liquid and at least one sol-gel precursor having at least one non-hydrolyzable substituent; and (ii) a second emulsion containing at least one hydrolyzable sol-gel precursor, wherein the at least one sol-gel precursor of (i) is present in an amount of up to 10% of the total sol-gel precursor of (i) and (ii); curing the mixture to prepare microcapsule particles; and adding a surfactant or polymer.

In a further embodiment, the method involves mixing an oil or aqueous liquid with (i) at least one sol-gel precursor having at least one non-hydrolyzable substituent; and (ii) at least one hydrolyzable sol-gel precursor, wherein the at least one sol-gel precursor of (i) is present in an amount of up to 10% of the total sol-gel precursor of (i) and (ii) to form a first mixture; cooling the first mixture to room temperature; adding the first mixture to a room temperature emulsifier solution to produce a second mixture; homogenizing the second mixture to produce a homogenized mixture; adding a defoamer to the homogenized mixture; curing the mixture to prepare microcapsule particles and adding a polymer or surfactant.

A microcapsule particle composition containing a core formed from an oil or aqueous liquid containing at least one active ingredient; a shell encapsulating said core, wherein said shell is composed of at least one hydrolyzable metal or semi-metal oxide polymer; and a surfactant or polymer is also provided as is a process for preparing said composition. In accordance with the method, an emulsion containing an oil or aqueous liquid and at least one hydrolyzable sol-gel precursor are combined in a sol-gel process; the product is cured and a surfactant or polymer is added to the cured product.

In some embodiments, the oil or aqueous liquid comprises at least one active ingredient such as a fragrance. In another embodiment, the non-hydrolyzable sol-gel precursor is a monomer of the formula: $M(R)_n(P)_m$, wherein M is a metallic or a semi-metallic element, R is a hydrolyzable substituent, n is an integer from 1 to 6, P is a non-hydrolyzable substituent, and m is and integer from 1 to 6. In accordance with this embodiment, the non-hydrolyzable sol-gel precursor can be a silicon alkoxide such as dimethyldiethoxysilane, n-octylmethyldiethoxysilane, hexadecyltriethoxysilane, diethyldiethoxysilane, 1,1,3,3-tetraethoxy-1,3-dimethyldisiloxane, or poly(diethoxysiloxane). In a further embodiment, the hydrolyzable sol-gel precursor is a monomer of the formula $M(R)_n$: wherein M is a metallic or a semi-metallic element, R is a hydrolyzable substituent, and n is an integer from 1 to 6. In accordance with this embodiment, the hydrolyzable sol-gel precursor can be a silicon alkoxide such as tetramethyl orthosilicate, tetraethyl orthosilicate or tetrapropyl orthosilicate. In yet other embodiments, the mixture is cured at room temperature or at a temperature of between 30° and 70° C. Microcapsule particle preparations, personal care products, therapeutic products, cosmetic products and cosmeceutic products containing the microcapsule particles are also provided.

In further embodiments, the surfactant or polymer can be an anionic surfactant or polymer. The preferred anionic surfactant is a phosphate ester. Examples include CRODAFOS O10A-SS(RB), which is a polyoxyethylene (10) oleyl ether phosphate, and CRODAFOS O30A, which is polyoxyethylene (3) oleyl ether phosphate from Croda Inc. Edison, N.J. The surfactant can be used from 0.1% to 5% of the total capsules weight. The most preferable range is from 0.1 to 0.2%.

DETAILED DESCRIPTION OF THE INVENTION

Figure 1A:
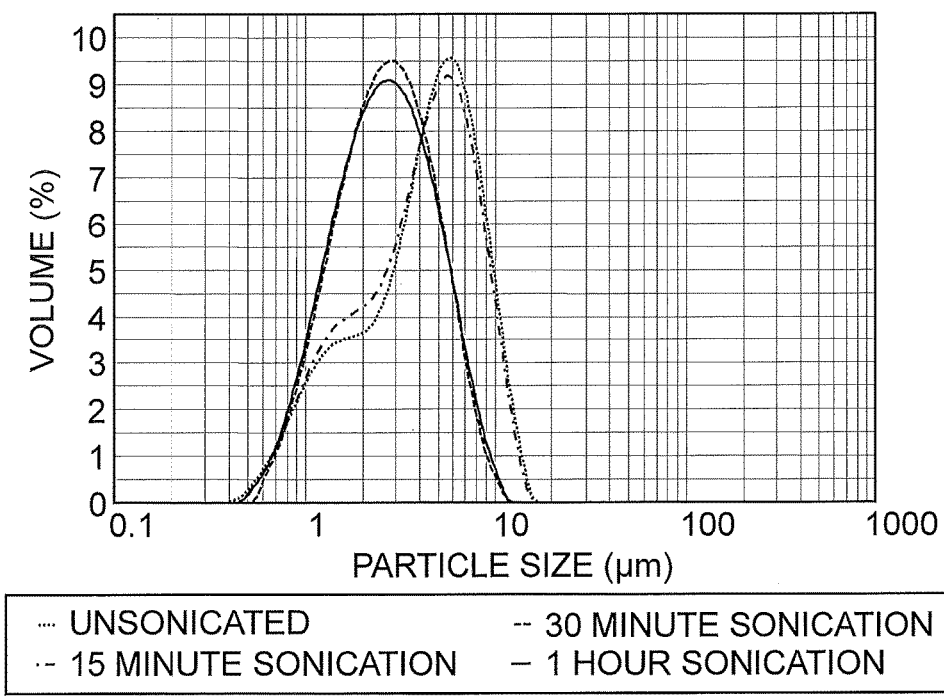
FIGS. 1A and 1B show particle size distribution of two different batches of Posh Special particles composed of TEOS only.

It has now been shown that the inclusion of a sol-gel precursor, having a non-hydrolyzable substituent, in a sol-gel reaction containing a hydrolyzable sol-gel precursor produces a microcapsule particle that is less resistant to breakage compared to sol-gel reactions containing a hydrolyzable sol-gel precursor only. Given their size and ease in releasing active ingredients contained therein, the instant microcapsule particles are of particular use in personal care, therapeutic, cosmetic or cosmeceutic applications including topical application to the skin, hair, ears, mucous membranes, rectal application, and nasal application, as well as dental or gum application within the oral cavity.

Compositions for topical application typically contain, in addition to active ingredients, other ingredients such as flavoring agents, insect repellents, fragrances, colors and dyes. These ingredients often cause complications, when formulated in such compositions. For example, fragrances have no therapeutic action, yet they often cause skin irritation. Entrapment of fragrances may thus serves to decrease skin sensitivity to fragrances, while extending their effectiveness period through sustained release. Colors and dyes are also typically incompatible with formulation ingredients. Thus, using the compositions and methods of the present invention, they can be protected by encapsulation and released upon application.

Accordingly, the present invention features a microcapsule particle composed of a core formed from an oil or aqueous liquid containing an active ingredient; and a shell encapsulating said core, wherein said shell is composed of (i) at least one hydrolyzable metal or semi-metal oxide polymer, and (ii) at least one metal or semi-metal oxide polymer having a non-hydrolyzable substituent, wherein the metal or semi-metal oxide polymer having the non-hydrolyzable substituent is present in an amount up to 10% of the total weight of the shell (iii) a phosphate ester surfactant in a amount of up to 5% of the total capsules slurry.

For the purposes of the present invention, an oil or aqueous liquid is intended to include an oil solution, an aqueous solution, a dispersion or an emulsion such as an oil-in-water emulsion. An "active ingredient" refers to an ingredient having a biological, therapeutic, cosmetic or cosmeceutic effect, and includes, but is not limited to, biological active materials, such as cells, proteins such as antibodies, nucleic acids (e.g., siRNA and antisense molecules), small organic molecules, inorganic molecules (e.g., isotopes), carbohydrates, lipids, fatty acids and the like. Examples of particular active ingredients that are useful for topical application and can be beneficially encapsulated in the microcapsules of the present invention include vitamins, anti-inflammatory agents, analgesics, anesthetics, anti-fungal agents, antibiotics, anti-viral agents, anti-parasitic agents, anti-acne agents, humectants, dermatological agents, enzymes and co-enzymes, insect repellents, perfumes, aromatic oils, colors, dyes, skin whitening agents, flavoring agents, anti-histamines, dental agents or chemotherapeutic agents.

As used herein, the term "vitamins" refers to any acceptable vitamin, a derivative thereof and a salt thereof. Examples of vitamins include, but are not limited to, vitamin A and its analogs and derivatives (e.g., retinol, retinal, retinyl palmitate, retinoic acid, tretinoin, and iso-tretinoin, known collectively as retinoids), vitamin E (tocopherol and its derivatives), vitamin C (L-ascorbic acid and its esters and other derivatives), vitamin B3 (niacinamide and its derivatives), alpha hydroxy acids (such as glycolic acid, lactic acid, tartaric acid, malic acid, citric acid, etc.) and beta hydroxy acids (such as salicylic acid and the like).

Anti-inflammatory agents include, e.g., methyl salicylate, aspirin, ibuprofen, and naproxen. Additional anti-inflammatories useful in topical applications include corticosteroids, such as, but not limited to, flurandrenolide, clobetasol propionate, halobetasol propionate, fluticasone propionate, betamethasone dipropionate, betamethasone benzoate, betamethasone valerate, desoximethasone, dexamethasone, diflorasone diacetate, mometasone furoate, amcinodine, halcinonide, fluocinonide, fluocinolone acetonide, desonide, triamcinolone acetonide, hydrocortisone, hydrocortisone acetate, fluoromethalone, methylprednisolone, and predinicarbate.

Anesthetics that can be delivered locally include benzocaine, butamben, butamben picrate, cocaine, procaine, tetracaine, lidocaine and pramoxine hydrochloride.

Suitable analgesics include, but are not limited to, ibuprofen, diclofenac, capsaicin, and lidocaine.

Non-limiting examples of anti-fungal agents include micanazole, clotrimazole, butoconazole, fenticonasole, tioconazole, terconazole, sulconazole, fluconazole, haloprogin, ketonazole, ketoconazole, oxinazole, econazole, itraconazole, torbinafine, nystatin and griseofulvin.

Non-limiting examples of antibiotics include erythromycin, clindamycin, synthomycin, tetracycline, metronidazole and the like.

Anti-viral agents include, but are not limited to, famcyclovir, valacyclovir and acyclovir.

Non-limiting examples of anti-parasitic agents include scabicedes, such as permethrin, crotamiton, lindane and ivermectin.

Anti-infectious and anti-acne agents include, but are not limited to, benzoyl peroxide, sulfur, resorcinol and salicylic acid.

Non-limiting examples of humectants include glycerol, sodium pyroglutamate and ornithine.

Dermatological active ingredients useful in topical applications include, e.g., jojoba oil and aromatic oils such as methyl salicylate, wintergreen, peppermint oil, bay oil, eucalyptus oil and citrus oils, as well as ammonium phenolsulfonate, bismuth subgallate, zinc phenolsulfonate and zinc salicylate.

Examples of enzymes and co-enzymes useful for topical application include co-enzyme Q10, papain enzyme, lipases, proteases, superoxide dismutase, fibrinolysin, desoxyribonuclease, trypsin, collagenase and sutilains.

Non-limiting examples of skin whitening agents include hydroquinone and monobenzone.

Anti-histamines include, but are not limited to, chlorpheniramine, brompheniramine, dexchlorpheniramine, tripolidine, clemastine, diphenhydramine, prometazine, piperazines, piperidines, astemizole, loratadine and terfonadine.

The phrase "dental agent" refers to a tooth whitener, a cleanser, a flavor for a toothpaste or mouthwash, a vitamin or other substance having a therapeutic effect on the teeth or oral cavity. Non-limiting examples of dental agents include bleaching agents such as urea peroxide, benzoyl peroxide, sodium perborate and sodium percarbonate.

Non-limiting examples of chemotherapeutic agents include 5-fluorouracil, masoprocol, mechlorethamine, cyclophosphamide, vincristine, chlorambucil, streptozocin, methotrexate, bleomycin, dactinomycin, daunorubicin, coxorubicin and tamoxifen.

Examples of flavoring agents are methyl salicylate and peppermint oil, which can be formulated, for example, within a composition useful for dental application.

Non-limiting examples of insect repellents include pediculicides for treatment of lice, such as pyrethrins, permethrin, malathion, lindane and the like.

Fragrances are also considered active ingredients within the scope of the invention as they alter aroma characteristics of a composition by modifying the olfactory reaction contributed by another ingredient in the composition. The amount active ingredient in the instant composition will vary depending on many factors including other ingredients, their relative amounts and the effect that is desired. Fragrances suitable for use in this invention include without limitation, any combination of fragrance, essential oil, plant extract or mixture thereof that is compatible with, and capable of being encapsulated by a monomer or a polymer. Examples of fragrances include but are not limited to fruits such as almond, apple, cherry, grape, pear, pineapple, orange, strawberry, raspberry; musk, flower scents such as lavender-like, rose-like, iris-like, and carnation-like. Other pleasant scents include herbal scents such as rosemary, thyme, and sage; and woodland scents derived from pine, spruce and other forest smells. Fragrances may also be derived from various oils, such as essential oils, or from plant materials such as peppermint, spearmint and the like. Other familiar and popular smells can also be employed such as baby powder, popcorn, pizza, cotton candy and the like in the present invention. A list of suitable fragrances is provided in U.S. Pat. Nos. 4,534,891, 5,112,688 and 5,145,842. Another source of suitable fragrances is found in *Perfumes Cosmetics and Soaps*, Second Edition, edited by W. A. Poucher, 1959. Among the fragrances provided in this treatise are acacia, cassie, chypre, cylamen, fern, gardenia, hawthorn, heliotrope, honeysuckle, hyacinth, jasmine, lilac, lily, magnolia, mimosa, narcissus, freshly-cut hay, orange blossom, orchids, reseda, sweet pea, trefle, tuberose, vanilla, violet, wallflower, and the like. In particular embodiments, the fragrance has a high odor-activity. In further embodiments, the fragrance has a ClogP of greater than 3.3, or more preferably greater than 4. Such fragrances include, but are not limited to Allyl cyclohexane propionate, Ambrettolide, Amyl benzoate, Amyl cinnamate, Amyl cinnamic aldehyde, Amyl cinnamic aldehyde dimethyl acetal, Iso-amyl salicylate, AURANTIOL, Benzyl salicylate, para-tert-Butyl cyclohexyl acetate, Iso butyl quinoline, beta-Caryophyllene, Cadinene, Cedrol, Cedryl acetate, Cedryl formate, Cinnamyl cinnamate, Cyclohexyl salicylate, Cyclamen aldehyde, Diphenyl methane, Diphenyl oxide, Dodecalactone, ISO E SUPER, Ethylene brassylate, Ethyl undecylenate, EXAL-TOLIDE, GALAXOLIDE, Geranyl anthranilate, Geranyl phenyl acetate, Hexadecanolide, Hexenyl salicylate, Hexyl cinnamic aldehyde, Hexyl salicylate, Alpha-Irone, LILIAL, Linalyl benzoate, Methyl dihydrojasmone, Gamma-n-Methyl ionone, Musk indanone, Musk tibetine, Oxahexadecanolide-10, Oxahexadecanolide-11, Patchouli alcohol, PHANTOLIDE, Phenyl ethyl benzoate, Phenylethylphenylacetate, Phenyl heptanol, Alpha-Santalol, THIBETOLIDE, Delta-Undecalactone, Gamma-Undecalactone, Vetiveryl acetate, Ylangene, Methyl Beta Napthyl Ketone, Terpeneol Couer, Geraniol, Dihydromyrcenol, Citronellol 950, and Tetrahydromyrcenol.

According to one embodiment, a personal care, therapeutic, or cosmeceutic composition further includes an adjuvant. As used herein, the term "adjuvant" refers to a material used in conjunction with the active ingredient to preserve the stability of the active ingredient within the composition. The adjuvant can be encapsulated with the active ingredient within the microcapsular core, or be present in the acceptable carrier that surrounds the microcapsules. The adjuvant may further serve to preserve the stability of non-encapsulated active ingredients within the carrier. Typical adjuvants include, for example, anti-oxidants, metal sequestering agents, buffering agents and mixtures thereof. In one example, a metal sequestering agent is used as an adjuvant encapsulated together with vitamin C. The encapsulated metal sequestering agent in this case can be, for example, ethylenediamine tetra acetic acid, hexamethylenediamine tetra acetic acid, ethylenediamine tetra(methylenephosphonic acid), diethylenetriamine penta(methylenephosphonic acid), or hexamethylenediamine tetra (methylene phosphonic acid), derivatives thereof, salts thereof and/or mixtures thereof.

In another example, an anti-oxidant is encapsulated as an adjuvant together with a retinoid. The antioxidant can be, for example, butylated hydroxy toluene (BHT), butylated hydroxy anisole (BHA), vitamin E, vitamin E acetate, vitamin E palmitate, vitamin C, an ester of vitamin C, a salt of vitamin C and/or mixtures thereof.

The active ingredient may also be combined with a variety of solvents that serve to increase the compatibility of the various materials, increase the overall hydrophobicity, influence the vapor pressure of the materials, or serve to structure the core. Solvents performing these functions are well known in the art and include mineral oils, triglyceride oils, silicone oils, fats, waxes, fatty alcohols, diisodecyl adipate, and diethyl phthalate among others.

The active ingredient included the microcapsule particles of the invention can be a single species or can be a combination of active ingredients. The level of active ingredient in the microcapsule varies from about 5 to about 95 weight percent, preferably from about 30 to about 95 and most preferably from about 50 to about 90 weight percent on a dry basis.

As the composition of the present invention is beneficial for topical application of a wide variety of active ingredients, it can be efficiently used in the treatment of various disorders and conditions. Thus, the present invention also features a method of treating a skin, hair, ear, mucosal membrane, rectal, nasal or dental condition in a subject in need thereof. The method is carried out by topically applying the composition of the present invention onto the area to be treated. Non-limiting examples of the conditions, diseases or disorders that are treatable by the method of the present invention include, for example, acne, psoriasis, seborrea, bacteria, virus or fungus infections, inflammatory process, aging signs, dandruff and cavity.

According to the present invention, a microcapsule particle composition is produced with a core material encapsulated within a microcapsular shell. In general, microcapsule particles of the invention are prepared by mixing an oil or aqueous liquid containing an active ingredient with sol-gel precursors under suitable conditions so that a gel is formed and the active material is encapsulated. Sol-gel precursors, i.e., starting compounds capable of forming gels, are known in the art and sol-gel methods are routinely practiced in the art. Suitable sol-gel precursors for practicing the present invention include, for example, metals such as silicon, boron, aluminum, titanium, zinc, zirconium and vanadium. According to one embodiment, preferred sol-gel precursors are silicon, boron and aluminum compounds, more particularly organosilicon, organoboron and organoaluminum compounds. The precursors can also include metal alkoxides and b-diketonates. Sol-gel precursors suitable for the purposes of the invention include di-, tri- and/or tetrafunctional silicic acid, boric acid and alumoesters, more particularly alkoxysilanes (alkyl orthosilicates), alkylalkoxysilanes, and precursors thereof.

In particular, the present invention features blends of sol-gel precursors or monomers used in the preparation of microcapsule particles having modified release characteristics compared to particles produced from a single type of precursor. More specifically, the instant invention features a blend of sol-gel precursors that includes (1) at least one sol-gel precursor having at least one non-hydrolyzable substituent, also referred to herein as a "non-hydrolyzable sol-gel precursor" or "non-hydrolyzable precursor," and (2) at least one hydrolyzable sol-gel precursor. For the purposes of the present invention, the term "non-hydrolyzable substituent" means a substituent that does not separate from a metal or semi-metal atom during the sol-gel process. Such substituents are typically organic groups. On the contrary, the term "hydrolyzable sol-gel precursor" means a precursor having substituents eliminated by hydrolysis in the same conditions. In this respect, a hydrolyzable sol-gel precursor can be a monomer represented by the formula $M(R)_n$, wherein M is a metallic or a semi-metallic element as described herein; R is a hydrolyzable substituent, e.g., a $C_1$ to $C_{18}$ alkoxy group or aryloxy group; and n is an integer from 1 to 6. Similarly, a non-hydrolyzable sol-gel precursor can be a monomer represented by the formula $M(R)_n(P)_m$, wherein M is a metallic or a semi-metallic element as described herein; R is a hydrolyzable substituent as described herein; n is an integer from 1 to 6; P is a non-hydrolyzable substituent, e.g., an alkyl, aryl or alkenyl containing from 1 to 18 carbon atoms; and m is and integer from 1 to 6.

In some embodiments, the blend of sol-gel precursors includes at least one metal or semi-metal alkoxide sol-gel precursor having a non-hydrolyzable substituent and at least one hydrolyzable metal or semi-metal alkoxide sol-gel precursor. In accordance with this embodiment, a metal or semi-metal alkoxide sol-gel precursor having a non-hydrolyzable substituent can be a monomer represented by the formula $M(OR)_n(P)_m$, wherein M is a metallic or a semi-metallic element, R is a hydrolyzable substituent, n is an integer from 1 to 6, P is a non-hydrolyzable substituent and m is and integer from 1 to 6. Further, a hydrolyzable metal or semi-metal alkoxide sol-gel precursor can be a monomer represented by the formula $M(OR)_n$, wherein M is a metallic or a semi-metallic element as described herein; R is a hydrolyzable substituent; and n is an integer from 1 to 6. In some embodiments, the alkoxy group can be substituted by a $C_1$ to $C_4$ alkyl or alkoxy group or a halogen atom. In any of the above-referenced precursors, R can, of course, represent identical or different alkoxy groups. By way of illustration, R can be an alkylsilane, alkoxysilane, alkyl alkoxysilane or organoalkoxysilane. Besides the alkyl and alkoxy groups, other organic groups (for example allyl groups, aminoalkyl groups, hydroxyalkyl groups, etc.) may be attached as substituents to the metal.

In particular embodiments, the sol-gel precursors of the instant invention are alkoxysilanes represented by the formulae $Si(OR)_n(P)_m$ (sol-gel precursor having a non-hydrolyzable substituent) and $Si(OR)_n$ (hydrolyzable sol-gel precursor), wherein R is a hydrolyzable substituent, n is an integer from 1 to 6, P is a non-hydrolyzable substituent and m is and integer from 1 to 6. Particular examples of hydrolyzable alkoxysilane sol-gel precursors include silicic acid esters such as tetramethyl orthosilicate (TMOS), tetraethyl orthosilicate (TEOS) or the tetrapropyl orthosilicate. A preferred compound includes DYNASYLAN A (commercially available from Degussa Corporation, Parsippany, N.J.). Specific examples of alkoxysilane sol-gel precursors having a non-hydrolyzable substituent include, but are not limited to, dimethyldiethoxysilane (DMDEOS), n-octylmethyldiethoxysilane (OMDEOS) and hexadecyltriethoxysilane (HDTEOS), diethyldiethoxysilane, 1,1,3,3-tetraethoxy-1,3-dimethyldisiloxane, or poly(diethoxysiloxane).

Using the blends of the instant invention, microcapsule particles are produced, which have shells composed of at least one hydrolyzable metal or semi-metal oxide inorganic polymer, and at least metal or semi-metal oxide inorganic polymer having a non-hydrolyzable substituent. Advantageously, the blends of the invention yield microcapsule particles in the range of 0.5 to 10 microns which are less resistant to breakage compared to microcapsule particles produced by sol-gel reactions containing a hydrolyzable sol-gel precursor only. In this respect, the instant microcapsule particles are more easily broken or ruptured by physical means (e.g., sonication or rubbing) than microcapsule particles produced by sol-gel reactions containing a hydrolyzable sol-gel precursor only. The differing physical property of the microcapsule particle prepared by the current allows one to engineer and control the release property and performance of the targeted delivery systems.

As shown in the results presented herein, the amount of non-hydrolyzable sol-gel precursor included in the instant particles can be between 1% and 10%. Indeed, particle performance in fabric evaluations was good when the level of non-hydrolyzable sol-gel precursor were present at up to 10%. However, it was observed that in some instances amounts of non-hydrolyzable sol-gel precursor in excess of 5% had an adverse effect on particle formation. Accordingly, in particular embodiments of the present invention, the non-hydrolyzable sol-gel precursor is present in an amount of up to 5, 6, 7, 8, 9 or 10% of the total weight of sol-gel precursor used in the sol-gel reaction. As such, the resulting the non-hydrolyzable polymer component of the microcapsule shell contains up to 10% of the non-hydrolyzable metal or semi-metal oxide polymer. In some embodiments, the non-hydrolyzable sol-gel precursor is present in an amount of between 0.1% and 10% of the total weight of sol-gel precursor in the sol-gel reaction. In other embodiments, the non-hydrolyzable sol-gel precursor is present in an amount of between 0.5% and 10% of the total weight of sol-gel precursor in the sol-gel reaction. In certain embodiments, the non-hydrolyzable sol-gel precursor is present in an amount of between 1% and 10% of the total weight of sol-gel precursor in the sol-gel reaction.

Moreover, wall thickness of the capsules can be controlled by varying the amount of monomer added. The ratio of monomer, such as TEOS, to that of the oil or aqueous liquid, may vary from about 2 to about 80 weight percent, preferably from about 5 to about 60 weight percent, more preferably from about 10 to about 50 weight percent, most preferably from about 15 to about 40 weight percent.

Microcapsule particles of the present invention can be prepared by several methods. In one embodiment, the instant microcapsule particles are produced by emulsifying an oil or aqueous liquid, which optionally contains an active ingredient, and mixing this first emulsion with a mixture of a hydrolyzable sol-gel precursor and non-hydrolyzable sol-gel precursor under appropriate conditions to form a sol-gel. In particular embodiments, the mixture of sol-gel precursors is added slowly to the first emulsion, e.g., drop-wise addition. In accordance with other embodiments of this method, the mixture of sol-gel precursors is either neat or alternatively prepared as a second emulsion. In this respect, one embodiment is of this method features producing microcapsule particles by emulsifying an oil or aqueous liquid, which optionally contains an active ingredient, and mixing this first emulsion, by drop-wise addition, with a neat mixture containing a hydrolyzable sol-gel precursor and non-hydrolyzable sol-gel precursor under appropriate conditions to form a sol-gel. As is conventional in the art, a neat mixture means that the mixture is not diluted with a solvent or mixed with other substances. In yet other embodiments of this method, the active ingredient is an oil fragrance, which is optionally mixed with an aqueous emulsifier solution prior to emulsification, and diluted with water prior to drop-wise addition to a second emulsion containing the sol-gel precursors under constant mixing.

In another embodiment, the instant microcapsule particles are produced by emulsifying the active ingredient with the non-hydrolyzable sol-gel precursor, and mixing this first emulsion with a second emulsion containing the hydrolyzable sol-gel precursor under appropriate conditions to form a sol-gel.

In still another embodiment, the instant microcapsule particles are produced by mixing an oil or aqueous liquid with a hydrolyzable sol-gel precursor and non-hydrolyzable sol-gel precursor; cooling this first mixture to room temperature; adding a room temperature emulsifier solution to the first mixture to produce a second mixture; homogenizing this second mixture to produce a homogenized mixture; and adding a defoamer to the homogenized mixture under appropriate conditions to form a sol-gel.

Emulsions of the instant methods can be prepared using any conventional technique such as mechanical means (e.g., homogenization with a high shear mixer), ultrasound or sonication and in some embodiments, the emulsions are diluted. Moreover, any conventional sol-gel process can be employed for preparing the microcapsule particles of the invention. For example, emulsions of the invention can be mixed under constant mixing and then allowed to cure at room temperature (i.e., 20° C. to 25° C.) until sol-gel capsules have formed. In other embodiments, emulsions of the invention are mixed under constant mixing and the mixture is allowed to cure at high temperature until sol-gel capsules have formed. For the purposes of the present invention, "high temperature" is intended to mean a temperature in the range of 30° C. to 70° C., or more particularly 40° C. to 60° C. In particular embodiments, the sol-gel mixture is cured at 50° C. In some embodiments, the method can further include the use of an emulsifier, which is combined with one or more emulsions prior to homogenization.

As is conventional in the art, an emulsifier is a substance that stabilizes an emulsion by increasing its kinetic stability. One class of emulsifiers is known as surface active substances, or surfactants. According to some embodiments of the invention, the emulsifier can be an anionic or cationic emulsifier. It is preferable that an cationic emulsifier be used for the formation of the fragrance emulsion When preparing the instant microcapsule particles, it is contemplated that more than one type of non-hydrolyzable and/or hydrolyzable precursor can be used. Moreover, more than one type of active ingredient can be encapsulated in a single microcapsule particle. Furthermore, a personal care, therapeutic, cosmetic or cosmeceutic product of the invention can contain more than one type of microcapsule particle, wherein each type of microcapsule particle contains a different blend of non-hydrolyzable and/or hydrolyzable precursors and different active ingredients thereby facilitating delivery of combinations of active ingredients, e.g., at different release rates depending on the composition and characteristics of the microcapsule particles.

In particular embodiment of the invention, a surfactant or polymer is added to the microcapsule particle composition after the composition is freshly cured. It has been surprisingly found that this added component provides the capsule slurry robust physical stability and superior performance. Accordingly, in some embodiments, the invention embraces a composition composed of a core formed from an oil or aqueous liquid containing at least one active ingredient; a shell encapsulating said core, wherein said shell is composed of at least one hydrolyzable metal or semi-metal oxide polymer; and a surfactant or polymer and a method of preparing said composition. One class of surfactants which is especially preferred are phosphate ester surfactants, such as oleth-3-phosphate or oleth-10-phosphate, e.g., CRODAOS surfactant. See, U.S. Pat. No. 6,117,915. The surfactant can be added at from 0.1 to 0.5% of the total capsule slurry weight. Other phosphate ester surfactants such as STEPFAC 8180 and STEPFAC 818, which are available from the Stepan Company; and ETHYLAN PS-121 and ETHYLAN PS-131 phosphate ester surfactant from Akzo Nobel Inc. In some embodiments, the neutralized phosphate ester may be used. Surfactants contemplated for use in the present invention may be anionic, nonionic or cationic surfactants known in the art.

In certain embodiments of this invention, the microcapsule particle composition is prepared in the presence of a defoamer.

Personal care, therapeutic, cosmetic or cosmeceutic products containing the instant microcapsule particles are also provided. In addition to the microcapsule particles of the invention, these products can further include an acceptable carrier. As used herein, an "acceptable carrier" refers to a carrier or a diluent that does not cause significant irritation to an organism and does not abrogate the biological activity and properties of the applied active ingredient. Examples of acceptable carriers that are useful in the context of the present invention include, without limitation, emulsions, creams, aqueous solutions, oils, ointments, pastes, gels, lotions, milks, foams, suspensions and powders.

The acceptable carrier of the present invention may include, for example, a thickener, an emollient, an emulsifier, a humectant, a surfactant, a suspending agent, a film forming agent, a foam building agent, a preservative, an anti-foaming agent, a fragrance, a lower monoalcoholic polyol, a high boiling point solvent, a propellant, a colorant, a pigment or mixtures thereof.

The nature of the microcapsule particles of the present invention and the ability to control this nature, as described herein, enable the design of compositions for various applications. In this respect, the active ingredient may be encapsulated alone or with other ingredients within the same microcapsule. Co-encapsulation of compounds that enhance stability of the sensitive ingredient is beneficial. For example, anti-oxidants can be co-encapsulated with oxygen-sensitive or oxidant-sensitive ingredients, to give "localized protection". Similarly, base-sensitive actives may be co-encapsulated with proton donating compounds that can act as a local buffer source. Acid-sensitive active ingredients can be co-encapsulated with proton acceptors, in order to protect them. Water-sensitive actives may show improved stability by encapsulation as solutes in a hydrophobic, water repelling oil. Co-encapsulating with sunscreen active ingredients, can protect light sensitive compounds. Co-encapsulation of a sensitive ingredient and a protective ingredient in one microcapsule, augments the efficacy of the protecting ingredient as both ingredients are encased together in the capsule. Moreover, by constructing such an organized system, the overall concentration of protecting ingredient, which is present in the composition, can be reduced significantly.

Since encapsulation creates specific units within the entire formulation, one active ingredient can be encapsulated while a second active ingredient can be present in the carrier that surrounds the microcapsules as a non-encapsulated active ingredient. This is advantageous when the ingredients acts synergistically together, yet one is chemically reactive with the other. For example, benzoyl peroxide, retinoids and certain antibiotics are all beneficial for the treatment of acne, yet cannot be formulated together since the peroxide would oxidize the other active ingredients. Therefore, benzoyl peroxide or any other strong oxidant may be encapsulated within microcapsules and other active ingredient(s) which are sensitive to oxidation can be present in the pharmaceutical carrier.

In a further embodiment, combinations of different encapsulated actives may be combined into one system. Specifically, two separate fragrances may be encapsulated and then combined into the same system to provide a dual fragrance effect in the final product.

According to the present invention, the instant microcapsule particle compositions can be applied topically to a variety of surfaces to deliver the active ingredients in the core of the particle. For example, the instant microcapsule particles can be applied to substrates such as cloth, hair, and skin during washing and rinsing processes. Further, it is desired that, once deposited, the capsules release the encapsulated fragrance either by diffusion through the capsule wall, via small cracks or imperfections in the capsule wall caused by drying, physical, or mechanical means, or by large-scale rupture of the capsule wall.

In another embodiment, the microcapsules of the present invention may be combined with different types of secondary microcapsules in the same product, such as friable microcapsules, moisture-activated and heat-activated. Friability refers to the propensity of the microcapsules to rupture or break open when subjected to direct external pressures or shear forces. For purposes of the present invention, a microcapsule is "friable" if, while attached to fabrics treated therewith, the microcapsule can be ruptured by the forces encountered when the capsule-containing fabrics are manipulated by being worn or handled (thereby releasing the contents of the capsule). As defined herein, a heat-activated microcapsule is one that ruptures by body heat and/or by the heat in a machine dryer and moisture activated microcapsules is one that ruptures when it comes in contact with moisture. Non-limiting examples of additional microcapsules include wax comprising microcapsule such as those described in U.S. Pat. No. 5,246,603 and starch-based microcapsule also described in U.S. Pat. No. 5,246,603.

Secondary microcapsules of the above-referenced types may be prepared using a range of conventional methods known to those skilled in the art for making shell capsules, such as interfacial polymerization, and polycondensation. See, e.g., U.S. Pat. No. 3,516,941, U.S. Pat. No. 4,520,142, U.S. Pat. No. 4,528,226, U.S. Pat. No. 4,681,806, U.S. Pat. No. 4,145,184; GB 2,073,132; WO 99/17871; and *Microencapsulation: Methods and Industrial Applications*, Edited by Benita and Simon (Marcel Dekker, Inc. 1996). It is recognized, however, that many variations with regard to materials and process steps are possible. Non-limiting examples of materials suitable for making shell of the microcapsule include urea-formaldehyde, melamine-formaldehyde, phenol-formaldehyde, gelatin, gelatin/gum arabic blend, polyurethane, polyamides, or combinations thereof.

Useful shell materials include materials such as polyethylenes, polyamides, polystyrenes, polyisoprenes, polycarbonates, polyesters, polyacrylates, polyureas, polyurethanes, polyolefins, polysaccharides, epoxy resins, vinyl polymers, and mixtures thereof. Suitable shell materials include materials such as reaction products of one or more amines with one or more aldehydes, such as urea cross-linked with formaldehyde or gluteraldehyde, melamine cross-linked with formaldehyde; gelatin-polyphosphate coacervates optionally cross-linked with gluteraldehyde; gelatin-gum Arabic coacervates; cross-linked silicone fluids; polyamine reacted with polyisocyanates and mixtures thereof. In one aspect, the shell material comprises melamine cross-linked with formaldehyde.

According to one embodiment of the invention, the instant microcapsule particle compositions are well-suited for personal care and cleaning products. The present invention is also suitable for wash-off products, which are understood to be those products that are applied for a given period of time and then are removed. Products suitable for this invention are common in areas such as laundry products, and include detergents, fabric conditioners, and the like; as well as personal care products which include shampoos, hair rinses, body washes, soaps, anti-perspirants, deodorants and the like. In one embodiment, an anti-perspirant roll-on personal care product is provided which contains an effective amount of the microcapsule particle composition of the present invention.

As described herein, the present invention is well suited for use in a variety of well-known consumer products such as laundry detergent and fabric softeners, liquid dish detergents, automatic dish detergents, as well as hair shampoos and conditioners. These products employ surfactant and emulsifying systems that are well known. For example, fabric softener systems are described in U.S. Pat. Nos. 6,335,315, 5,674,832, 5,759,990, 5,877,145, 5,574,179; 5,562,849, 5,545,350, 5,545,340, 5,411,671, 5,403,499, 5,288,417, 4,767,547, 4,424,134. Liquid dish detergents are described in U.S. Pat. Nos. 6,069,122 and 5,990,065; automatic dish detergent products are described in U.S. Pat. Nos. 6,020,294, 6,017,871, 5,968,881, 5,962,386, 5,939,373, 5,914,307, 5,902,781, 5,705,464, 5,703,034, 5,703,030, 5,679,630, 5,597,936, 5,581,005, 5,559,261, 4,515,705, 5,169,552, and 4,714,562. Liquid laundry detergents which can use the present invention include those systems described in U.S. Pat. Nos. 5,929,022, 5,916,862, 5,731,278, 5,565,145, 5,470,507, 5,466,802, 5,460,752, 5,458,810, 5,458,809, 5,288,431, 5,194,639, 4,968,451, 4,597,898, 4,561,998, 4,550,862, 4,537,707, 4,537,706, 4,515,705, 4,446,042, and 4,318,818. Shampoo and conditioners that can employ the present invention include U.S. Pat. Nos. 6,162,423, 5,968,286, 5,935,561, 5,932,203, 5,837,661, 5,776,443, 5,756,436, 5,661,118, 5,618,523, 5,275,755, 5,085,857, 4,673,568, 4,387,090 and 4,705,681.

In some embodiments, the water in the microcapsule particle composition may be removed to provide a final product in powder form. In this respect, spray dry carriers can be used in the instant compositions. Spray dry carriers include, but are not limited to, carbohydrates such as chemically modified starches and/or hydrolyzed starches, gums such as gum arabic, proteins such as whey protein, cellulose derivatives, clays, synthetic water-soluble polymers and/or copolymers such as polyvinyl pyrrolidone, polyvinyl alcohol. The spray dry carriers may be present in an amount from about 1% to about 50%, more preferably from about 5% to about 20%.

Optionally, a free flow agent (anti-caking agent) can be used. Free flow agents include silicas which may be hydrophobic (i.e., silanol surface treated with halogen silanes, alkoxysilanes, silazanes, siloxanes, etc. such as SIPERNAT D17, AEROSIL R972 and R974 (available from Degussa), etc.) and/or hydrophilic such as AEROSIL 200, SIPERNAT 22S, SIPERNAT 50S, (available from Degussa), SYLOID 244 (available from Grace Davison). The free flow agents may be present from about 0.01% to about 10%, more preferable from 0.5% to about 5%.

Further suitable humectants and viscosity control/suspending agents can also be included and are disclosed in U.S. Pat. Nos. 4,428,869, 4,464,271, 4,446,032, and 6,930,078. Details of hydrophobic silicas as a functional delivery vehicle of active materials other than a free flow/anti-caking agent are disclosed in U.S. Pat. Nos. 5,500,223 and 6,608,017.

In other embodiments of the present invention, the final composition or product may be in the form of an oil, a gel, a solid stick, a lotion, a cream, a milk, an aerosol, a spray, a powder, a foam, a shampoo, a hair conditioner, a lacquer or a make-up.

In other embodiments pertaining to spray-dried microcapsule particle compositions, such compositions can include products such as powder laundry detergent, fabric softener dryer sheets, household cleaning dry wipes, powder dish detergent, floor cleaning cloths, or any dry form of personal care products (e.g. shampoo powder, conditioner, personal wash, deodorant powder, foot powder, soap powder, baby powder), etc. Because of high fragrance and/or active agent concentration in the spray-dried products of the present invention, characteristics of the aforementioned consumer dry products will not be adversely affected by a small dosage of the spray-dried products.

The invention is described in greater detail by the following non-limiting examples.

Example 1: Preparation of Silica Capsules with a Single Sol-Gel Precursor

This example illustrates the preparation of silica capsules using a precursor where the central silicon atom is coordinated to four alkoxy groups. The empirical formula, is $Si(OR)_4$, where —OR is an alkoxy group and is hydrolyzable upon dispersion in water. In general, the method involves preparing a concentrated fragrance emulsification, diluting the fragrance emulsion to the desired concentration, and adding TEOS.

Preparation of Concentrated Fragrance Emulsion.

Two hundred and six grams fragrance oil was weighed out and placed in round bottom vessel. In a separate vessel, a 1.0% aqueous surfactant solution (120 g) was prepared by dissolving the needed amount of 30% cetyltrimethylammonium chloride (CTAC) surfactant solution in distilled water. The oil phase was then poured into the aqueous phase and the mixture was homogenized with a high shear mixer (Ultra Turrax T 25 Basic, IKA, Werke). Four drops of defoamer was added to suppress the foaming generated.

Preparation of Diluted Fragrance Emulsion.

Diluted fragrance emulsion was prepared by blending the concentrated fragrance emulsion with the desired amount of water to generate the desired concentration.

Preparation of Silica Capsules.

The formation of silica capsules was achieved by adding a single precursor to the diluted fragrance emulsion. The amount of precursor added was routinely determined by the wall polymer level needed and was generally 1% to 30% of the final formulation. Typically, the desired amount of precursor, tetraethyl orthosilicate (TEOS) was weighted out (35.91 g in this example) and placed in a clean and dry dropping funnel. The TEOS was then added dropwise into the diluted fragrance emulsion under constant mixing. The mixing speed was reduced once the addition of TEOS was complete. The system was the left at room and cured for an extended period of time. The pH of the system was maintained at approximately 3 to 4. The capsule formed was well dispersed and generally had a particle size ranging from submicron to one hundred micron depending on the emulsifier and shear rates used.

Example 2: Preparation of Silica Capsules Using a Blend of Precursors

This example illustrates the preparation of silica capsules using a blend of precursors. The blend was prepared using a mixture of precursors whose generic formula can be represented as $Si(OR)_4$ and $(R')_nSi(OR)_m$, where —R' is a non-hydrolyzable substituent and —OR is an alkoxy group that is hydrolyzable upon dispersion in water and n+m=4. In general, the method involved preparing a concentrated fragrance emulsification, diluting the fragrance emulsion to a desired concentration, and adding the TEOS.

Preparation of Concentrated Fragrance Emulsion.

Fragrance oil (234 g) was weighed out and placed in round bottom vessel. In a separate vessel, a 1.0% aqueous surfactant solution (135 g) was prepared by dissolving the needed amount of 30% CTAC surfactant solution in distilled water. The oil phase was then poured into the aqueous phase and the mixture was homogenized with a high shear mixer (Ultra Turrax T 25 Basic, IKA, Werke). Four drops of defoamer was added to suppress the foaming generated.

Preparation of Diluted Fragrance Emulsion.

Diluted fragrance emulsion was prepared by blending the concentrated fragrance emulsion with the desired amount of water to generate the desired concentration.

Preparation of Silica Capsules.

The amount of precursor added was routinely determined by the wall polymer level needed and was varied from 1% to 30% of the final formulation. In general, the desired amount of precursor, TEOS (39.6 g in this example) and DMDEOS (0.42 g in this example), was weighed out and placed in a clean and dry dropping funnel. The precursor blend (99% TEOS and 1% DMDEOS) was then added drop-wise into the diluted fragrance emulsion prepared in step two under constant mixing. Optionally, the DMDEOS was added to the diluted fragrance emulsion and emulsified prior to adding the TEOS. The mixing speed was reduced once the addition of precursor was complete. The system was the left at room temperature and cured for an extended period of time. The pH of the system was maintained at approximately 3 to 4. The capsule formed was well dispersed and generally had a particle size ranging from submicron to one hundred micron depending on the emulsifier and shear rates used.

Example 3: Preparation of Silica Capsules Using a Blend of Precursors and Curing at Elevated Temperature This example illustrates the preparation of silica capsules using a blend of precursors, wherein the capsules are subsequently cured at high temperature. The blend was prepared using a mixture of precursors whose generic formula can be represented as $Si(OR)_4$ and $(R')Si(OR)_3$, where —R' is a non-hydrolyzable substituent and —OR is an alkoxy group that is hydrolyzable upon dispersion in water. In general, the method involved preparing a concentrated fragrance emulsification, diluting the fragrance emulsion to a desired concentration, and adding the TEOS.

Preparation of Concentrated Fragrance Emulsion.

Fragrance oil (144 g) was weighed out and placed in round bottom vessel. In a separate vessel, a 1.0% aqueous surfactant solution (96 g) was prepared by dissolving the needed amount of 30% CTAC surfactant solution in distilled water. The oil phase was then poured into the aqueous phase and the mixture was homogenized with a high shear mixer (Ultra Turrax T 25 Basic, IKA, Werke). Four drops of defoamer were added to suppress the foaming generated.

Preparation of Diluted Fragrance Emulsion.

Diluted fragrance emulsion was prepared by blending the concentrated fragrance emulsion with the desired amount of water (144 g in this case, pH of water is 3.8) to generate the desired concentration.

Preparation of Silica Capsules.

The amount of precursor added was routinely determined by the wall polymer level needed and was varied from 1% to 30% of the final formulation. In general, the desired amount of precursor, TEOS (26.73 g in this example) and DMDEOS (0.27 g in this example), was weighed out and placed in a clean and dry dropping funnel. The precursor blend (99% TEOS and 1% DMDEOS) was then added dropwise into the diluted fragrance emulsion prepared in step two under constant mixing. After the mixing was completed, the mixture was heated to 50° C. and was kept at 50° C. for 2 hours before sample was discharged.

Example 4: Preparation of Silica Capsules Using a Blend of Precursors with Increased Amount of DMDEOS To determine the effect of non-hydrolyzable sol-gel precursor on the characteristics of the microcapsule particles, various amounts of non-hydrolyzable sol-gel precursor were used in the sol-gel reaction. The procedure for preparing the microcapsule particles was as described in Example 2. To prepare a 2% DMDEOS/98% TEOS blend, 231 g of fragrance was used and 39.5 g and 0.8 g of TEOS and DMDEOS were used, respectively. To prepare a 5%

DMDEOS/95% TEOS blend, 231 g of fragrance was used and 38.3 g and 2.2 g of TEOS and DMDEOS were used, respectively.

Example 5: Characteristics of Capsules Prepared with Precursor Blends

The effect of adding a non-hydrolyzable sol-gel precursor (DMDEOS) to hydrolyzable sol-gel precursor (TEOS) was determined by conducting solvent extraction experiments, and analyzing particle size distribution and skin substantivity.

Solvent Extraction.

Posh Special fragrance capsules were produced with TEOS or a blend of TEOS and DMDEOS and solvent extraction of the fragrance from the capsules was subsequently measured. As shown in Table 1, replicate experiments showed that capsules made with TEOS had slightly more extractable oil than samples made with the blend of TEOS and DMDEOS.

TABLE 1

| Extraction Time (minutes) | % Fragrance Extracted | | | |
|---|---|---|---|---|
| | TEOS Capsule | | TEOS + DMDEOS Capsule | |
| | Rep. 1 | Rep. 2 | Rep. 1 | Rep. 2 |
| 1 | 0.17 | 0.21 | 0.16 | 0.20 |
| 10 | 0.41 | 0.38 | 0.34 | 0.30 |
| 30 | 0.51 | 0.44 | 0.44 | 0.38 |
| 60 | 0.65 | 0.60 | 0.53 | 0.56 |

Subsequently, the amount of extractable oil from capsules containing Posh Special fragrance was determined as a function of the amount of DMDEOS in the capsules. As shown in Table 2, capsules made with a blend of TEOS and DMDEOS had slightly less solvent extractable oil than capsules made with TEOS only at several DMDEOS levels. However, it was noted that the results of the solvent extraction experiments using Posh Special fragrance was batch-dependent as batch 2 of the TEOS only capsule had less solvent extractable oil.

TABLE 2

| | % Fragrance Extracted | | | | | |
|---|---|---|---|---|---|---|
| | TEOS Capsule | | 0.5% DMDEOS + TEOS Capsule | 0.75% DMDEOS + TEOS Capsule | | 0.5% DMDEOS + TEOS Capsule |
| Extraction Time (minutes) | Batch 1 | Batch 2 | Batch 1 | Batch 1 | Batch 2 | Batch 1 |
| 1 | 0.21 | 0.14 | 0.15 | 0.20 | 0.17 | 0.14 |
| 10 | 0.38 | 0.17 | 0.23 | 0.30 | 0.22 | 0.23 |
| 30 | 0.44 | 0.20 | 0.31 | 0.38 | 0.30 | 0.32 |
| 60 | 0.60 | 0.25 | 0.39 | 0.56 | 0.44 | 0.43 |

To determine whether the solvent extraction results were fragrance-dependent, similar experiments were carried out with capsules containing Urban Legend fragrance, Perfect Match fragrance, or Psychadelic Gourmand fragrance. As shown in Tables 3-5, capsules made with a blend of TEOS and DMDEOS had more solvent extractable oil than capsules made with TEOS only.

TABLE 3

| Extraction Time (minutes) | % Urban Legend Fragrance Extracted | |
|---|---|---|
| | TEOS Capsule | DMDEOS + TEOS Capsule |
| 1 | 0.34 | 0.55 |
| 10 | 0.51 | 0.75 |
| 30 | 0.66 | 1.30 |
| 60 | 0.88 | 2.25 |

TABLE 4

| | % Perfect Match Fragrance Extracted | | | | | | |
|---|---|---|---|---|---|---|---|
| | TEOS Capsule | | 0.75% DMDEOS + TEOS Capsule | | 1.0% DMDEOS + TEOS Capsule | 1.5% DMDEOS + TEOS Capsule | |
| Extraction Time (minutes) | Batch 1 | Batch 2 | Batch 1 | Batch 2 | Batch 1 | Batch 1 | Batch 2 |
| 1 | 0.24 | 0.23 | 0.25 | 0.30 | 0.27 | 0.30 | 0.61 |
| 10 | 0.34 | 0.28 | 0.33 | 0.40 | 0.41 | 0.42 | 0.74 |
| 30 | 0.37 | 0.29 | 0.54 | 0.67 | 0.64 | 0.93 | 1.16 |
| 60 | 0.61 | 0.39 | 0.76 | 0.97 | 0.91 | 1.29 | 1.67 |

TABLE 5

| Extraction Time (minutes) | % Psychadelic Gourmand Fragrance Extracted | |
|---|---|---|
| | TEOS Capsule | DMDEOS + TEOS Capsule |
| 1 | 0.34 | 3.19 |
| 10 | 0.56 | 5.26 |
| 30 | 0.82 | 7.69 |
| 60 | 1.27 | 11.26 |

In general, the solvent extraction analysis indicated that capsules made with a blend of DMDEOS and TEOS had more extractable oil than capsules made with TEOS only. Moreover, the amount of extractable oil was fragrance-dependent.

Particle Size Distribution.

Figure 1B:
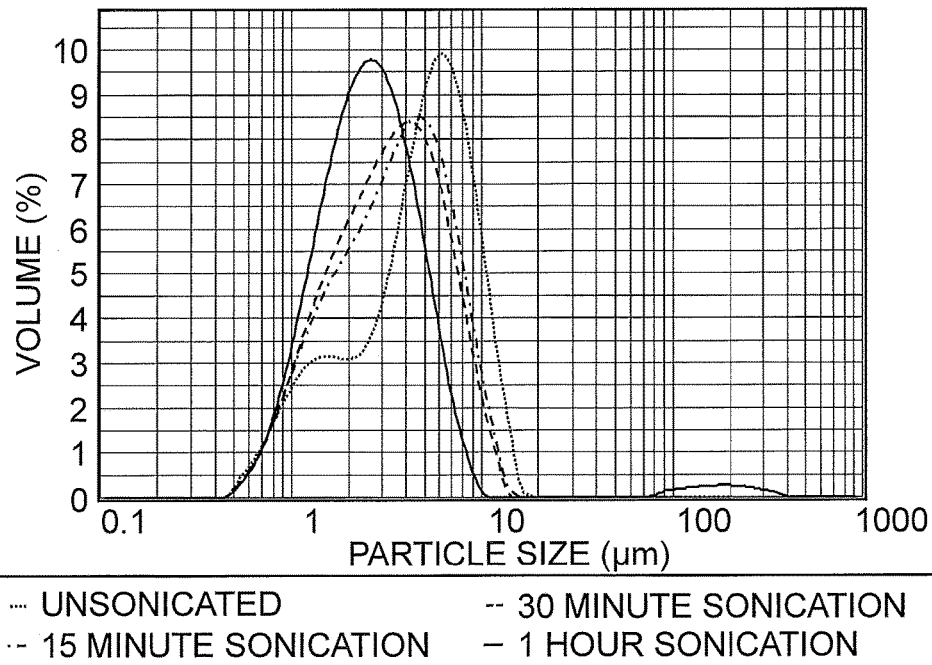
Figure 1C:
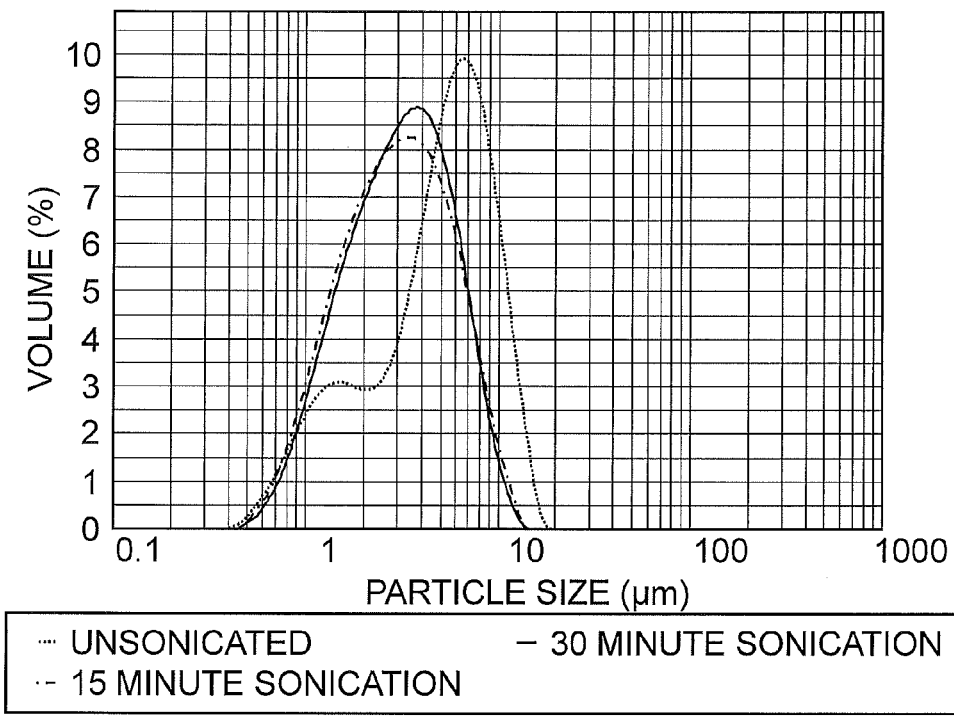
FIG. 1C shows particle size distribution of Posh Special particles composed of TEOS and 0.5% DMDEOS.
Figure 1D:
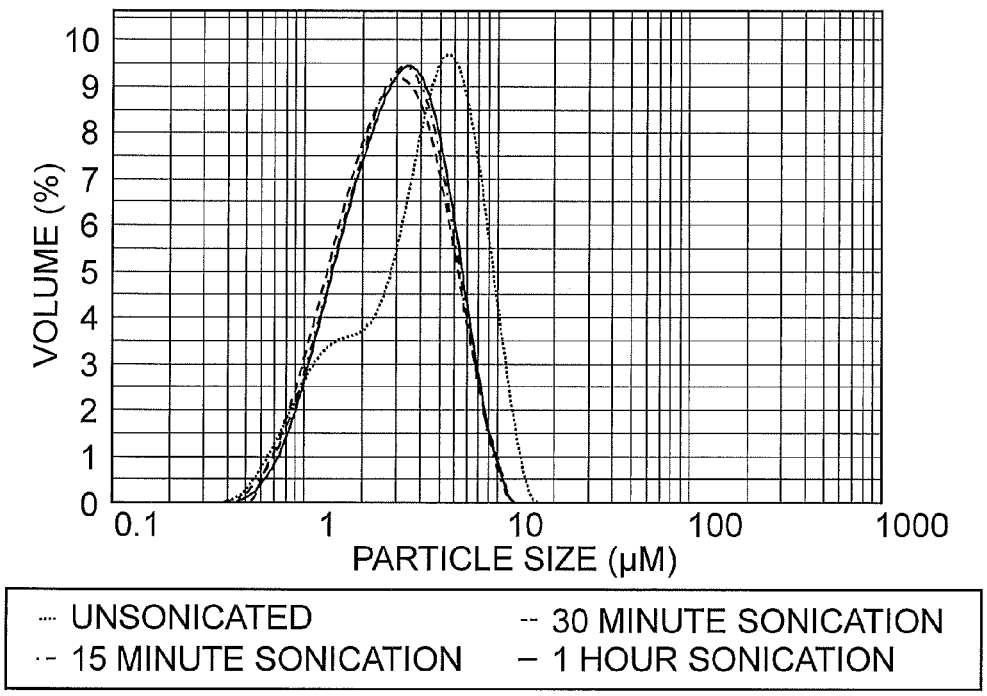
FIG. 1D shows particle size distribution of Posh Special particles composed of TEOS and 0.75% DMDEOS.
Figure 1E:
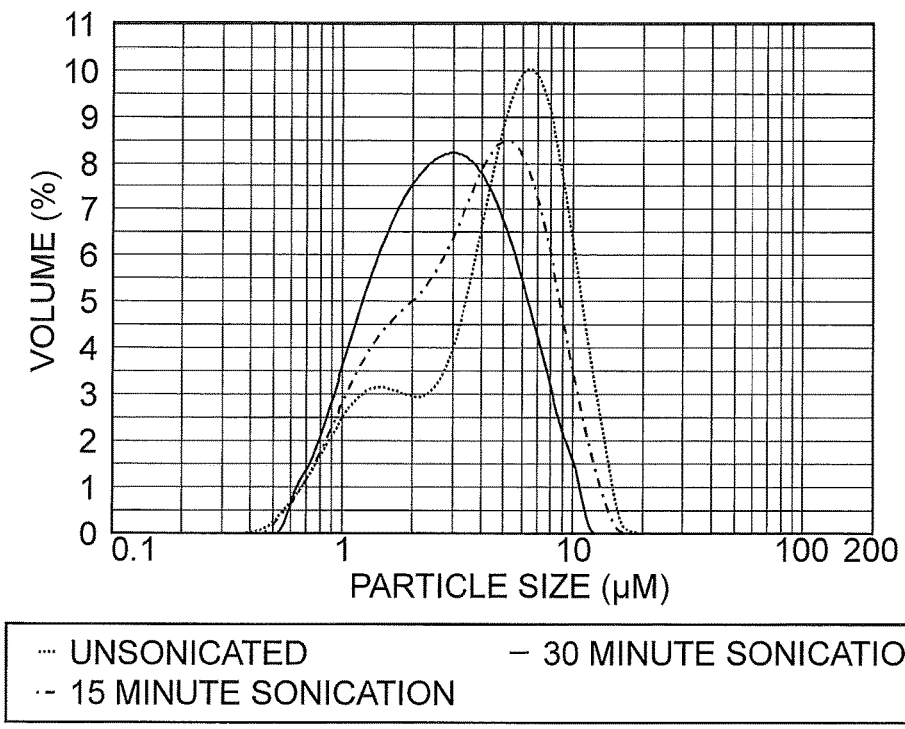
FIG. 1E shows particle size distribution of Posh Special particles composed of TEOS and 1.0% DMDEOS.
Figure 2A:
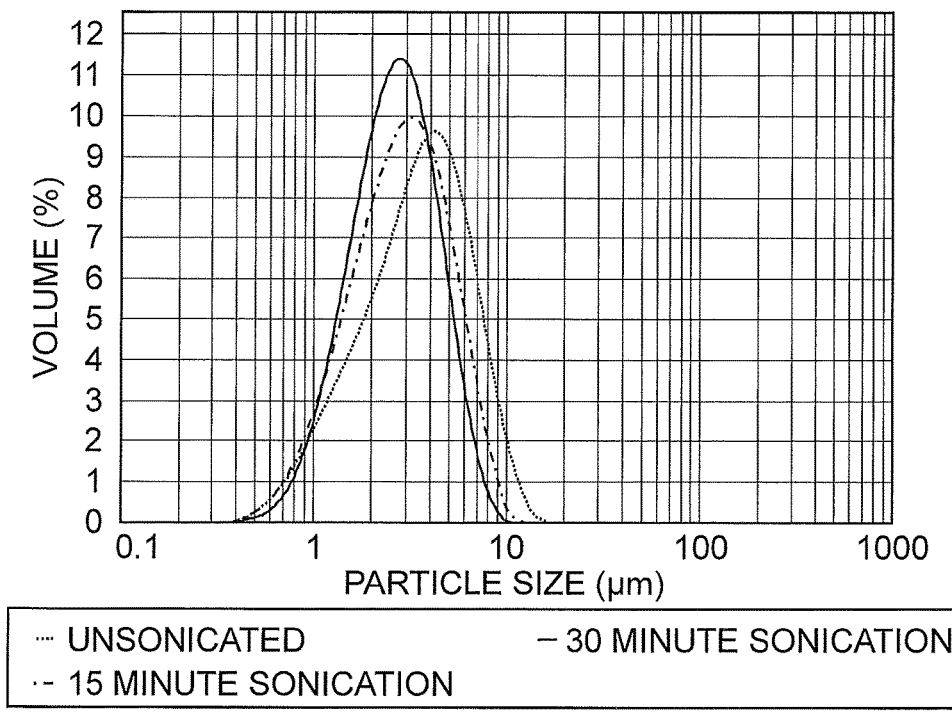
FIG. 2A shows particle size distribution of Psychadelic Gourmand particles composed of TEOS only.
Figure 2B:
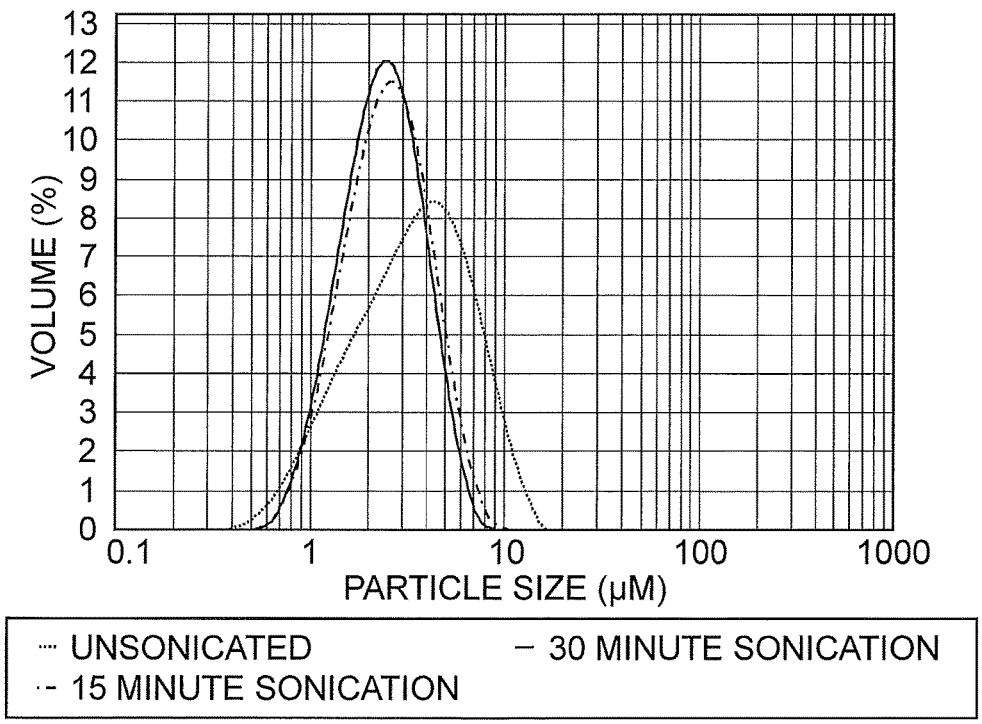
FIG. 2B shows particle size distribution of Psychadelic Gourmand particles composed of TEOS and 0.75% DMDEOS.
Figure 3A:
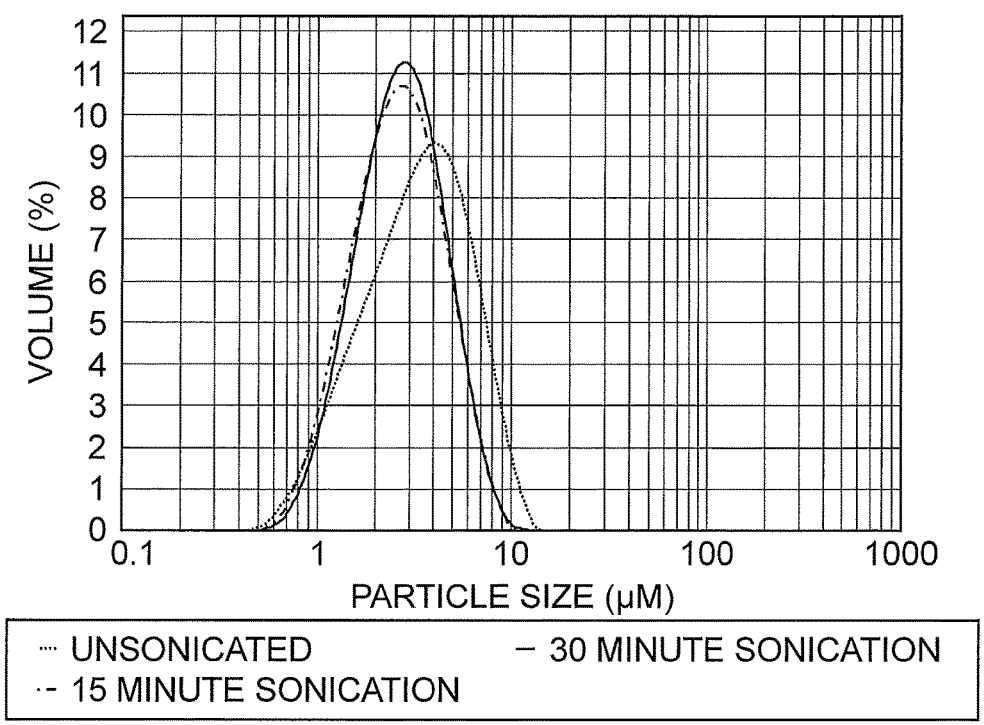
FIG. 3A shows particle size distribution of Urban Legend particles composed of TEOS only.
Figure 3B:
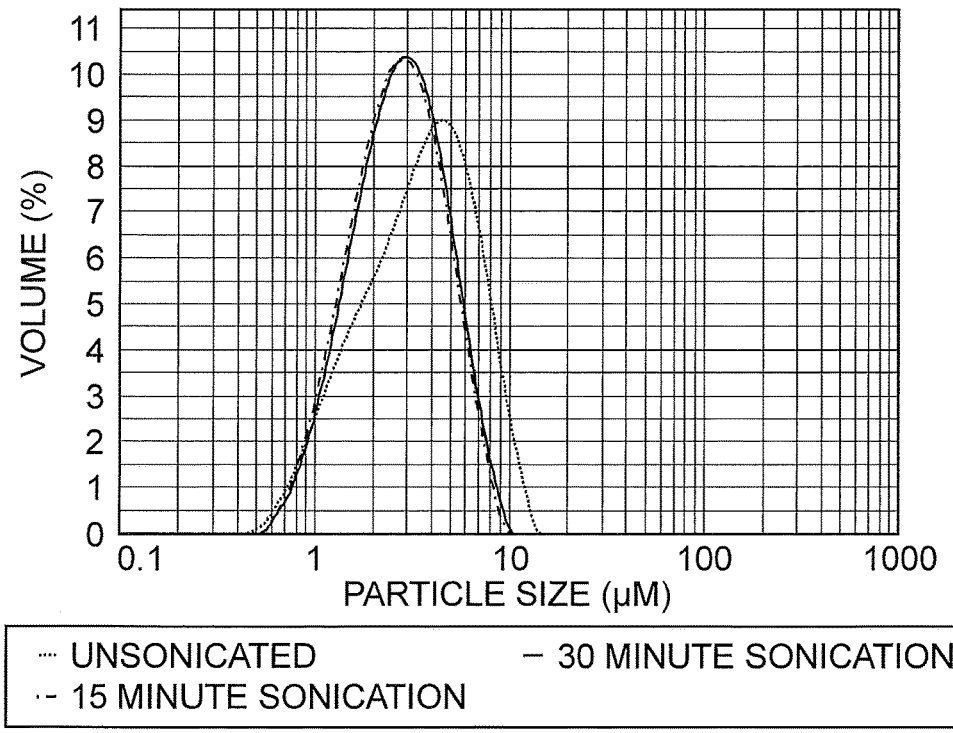
FIG. 3B shows particle size distribution of Urban Legend particles composed of TEOS and 0.75% DMDEOS.
Figure 4A:
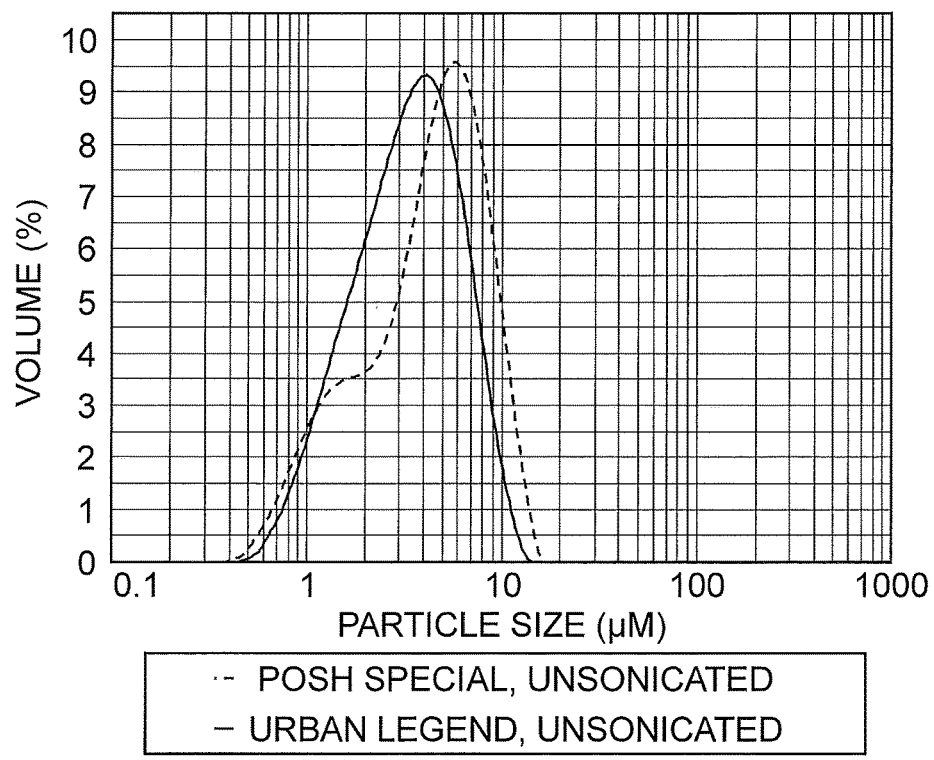
FIG. 4A shows particle size distribution of Posh Special capsules composed of TEOS only compared with that of Urban Legend particles composed of TEOS only.
Figure 4B:
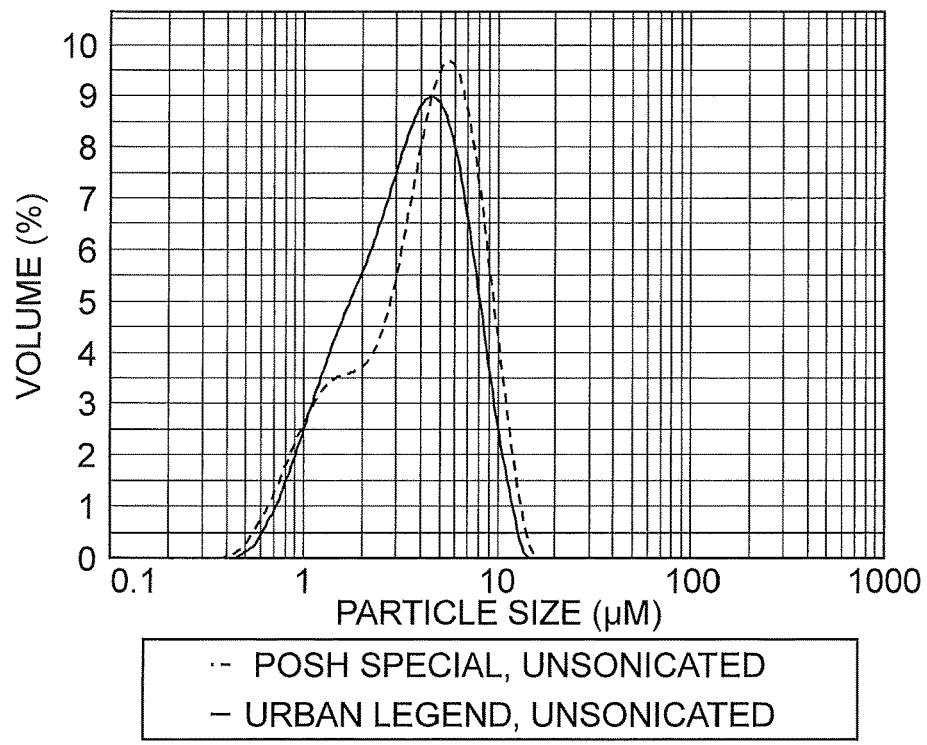
FIG. 4B shows particle size distribution of Posh Special capsules composed of TEOS and 0.75% DMDEOS compared with that of Urban Legend particles composed of TEOS and 0.75% DMDEOS.

Microcapsule particles composed of TEOS only or blends of DMDEOS and TEOS were prepared with various fragrances and particle size distribution and resistance to breakage by sonication was analyzed. The results of this analysis are presented in FIGS. 1-3, which show particle distribution of Posh Special particles composed of TEOS only (FIGS. 1A and 1B), Posh Special particles composed of TEOS and 0.5% DMDEOS (FIG. 1C), Posh Special particles composed of TEOS and 0.75% DMDEOS (FIG. 1D), Posh Special particles composed of TEOS and 1.0% DMDEOS (FIG. 1E), Psychadelic Gourmand particles composed of TEOS only (FIG. 2A), Psychadelic Gourmand particles composed of TEOS and 0.75% DMDEOS (FIG. 2B), Urban Legend particles composed of TEOS only (FIG. 3A), and Urban Legend particles composed of TEOS and 0.75% DMDEOS (FIG. 3B). Except in the case of Urban legend, capsules made with TEOS only were more resistant to sonication than capsules made with a blend of TEOS with DMDEOS at any level (see comparisons in FIGS. 4A and 4B), indicating that capsules made with TEOS only are more resistant to breakage. In this respect, one can take advantage of the difference in physical properties of the capsules prepared from the current invention to tailor the release properties of consumer delivery systems.

Sensory Evaluation and Analysis on Skin.

Figure 5:
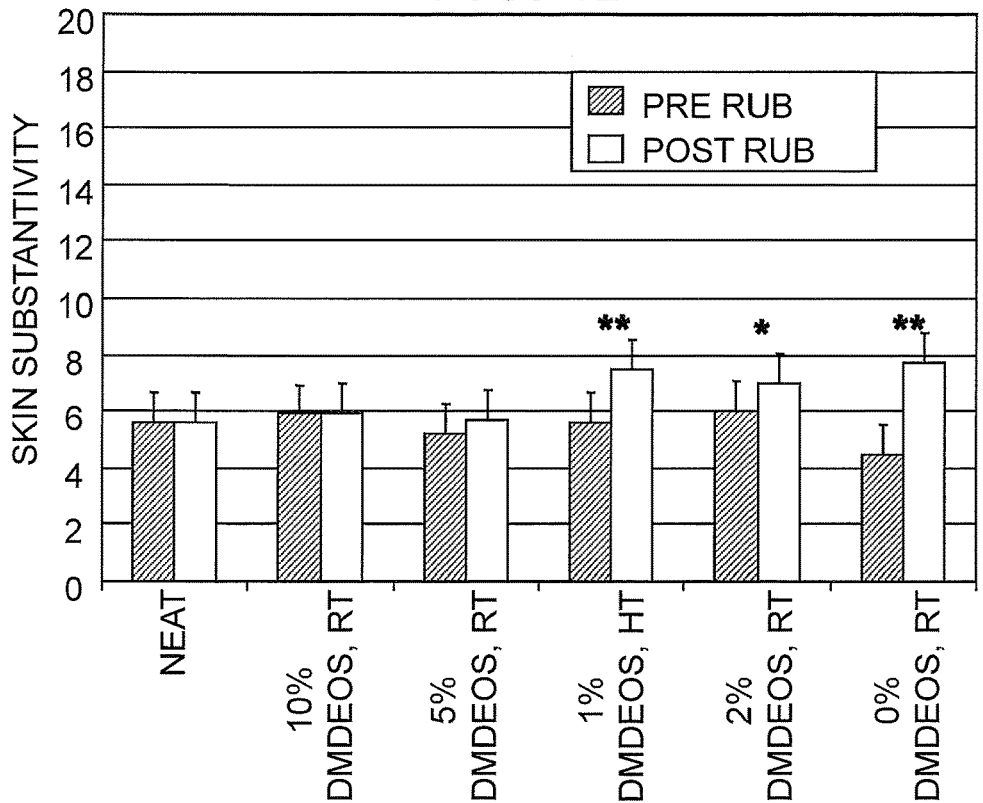
FIG. 5 shows results of skin substantivity results for microcapsule particles prepared with and without a non-hydrolyzable sol-gel precursor (DMDEOS). **Indicates a significant difference between pre and post for that sample. HT, high temperature curing. RT, room temperature curing. Neat, unencapsulated core material. Control, 0% DMDEOS.

One way to evaluate rub-off resistance is by determining the substantivity value of a composition (McNamara, et al. (1965) *J. Soc. Cosmet. Chem.* 16:499-506). The substantivity value or percent substantivity is the amount or percentage of the subject test composition remaining on the skin following a standard physical interaction or rub-off procedure, which, in the present case, also ruptures the instant microcapsule particles thereby releasing the active ingredient. FIG. 5 shows the results of skin substantivity analysis of particles produced with TEOS containing between 0% and 10% DMDEOS, which were cured at room temperature or high temperature (50° C.)

Additional analysis comparing TEOS microcapsule particles produced with (1%) or without DMDEOS and cured at room temperature indicated that the DMDEOS improved skin substantivity (Table 6).

TABLE 6

| Microcapsule Particle | Skin Substantivity | |
| --- | --- | --- |
|  | Pre-Rub | Post-Rub |
| 0% DMDEOS | 5.6 | 7.1 |
| 1% DMDEOS | 5.8 | 7.7 |

Sensory Evaluation and Analysis on Fabric.

Figure 6:
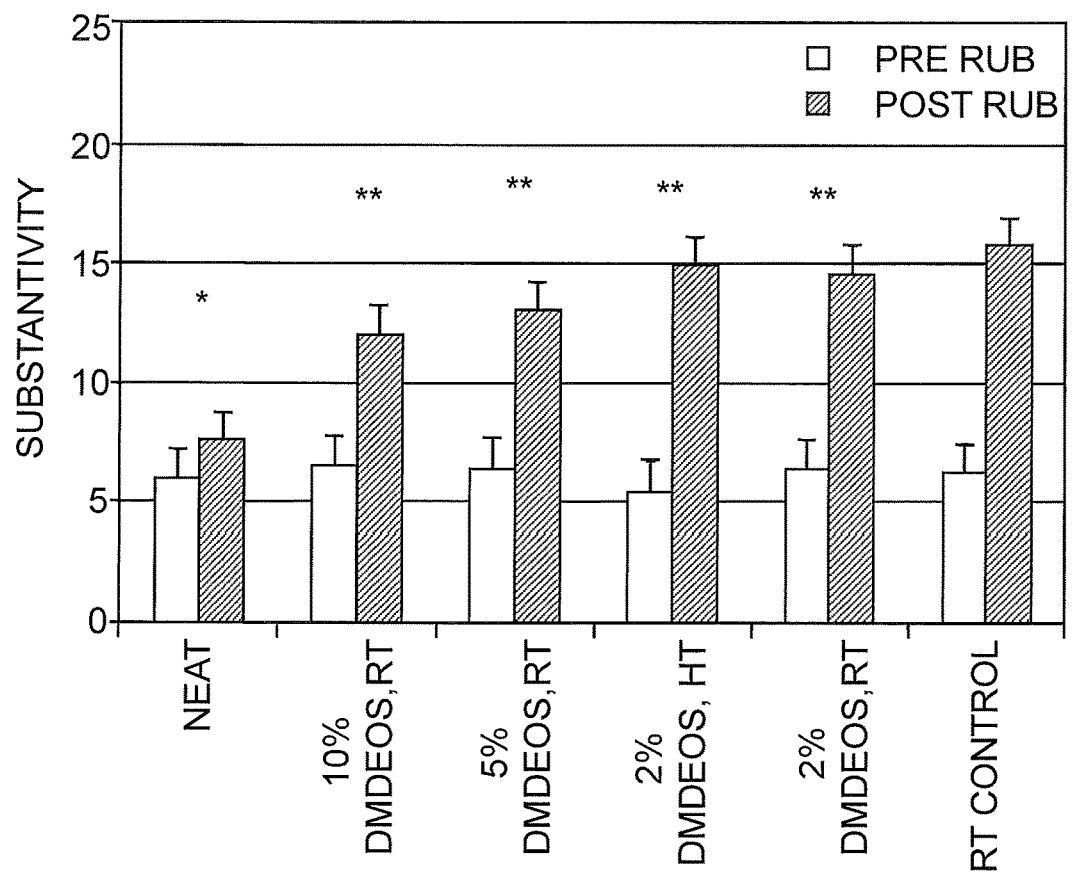
FIG. 6 shows results of fabric evaluation for microcapsule particles prepared with and without a non-hydrolyzable sol-gel precursor (DMDEOS). **Indicates a significant difference between pre and post rub for that sample. HT, high temperature curing. RT, room temperature curing. Neat, unencapsulated core material. Control, 0% DMDEOS.

FIG. 6 shows the results of fabric (LYCRA) evaluation of the microcapsule particle prepared in accordance with the present invention. All the samples performed significantly better than neat fragrance and had strong post-rubbing intensity, indicating the release of encapsulated fragrance under physical force. The larger difference in post-rubbing and pre-rubbing seen in the fabric evaluation compared to that seen in the skin evaluation reflected the effect of the different substrates used.

Example 6: Silica Capsules with Improved Performance and Physical Stability

This example illustrates the preparation of silica capsules using a blend of precursors. The blend was prepared using a mixture of precursors whose generic formula can be represented as $Si(OR)_4$ and $(R')_n Si(OR)_m$, where —R' is a non-hydrolyzable constituent and —OR is an alkoxy group that is hydrolyzable upon dispersion in water and n+m=4. In general, the method involved preparing a concentrated fragrance emulsification, diluting the fragrance emulsion to a desired concentration, and adding the TEOS.

Preparation of Concentrated Fragrance Emulsion.

Fragrance oil (234 g) was weighed out and placed in round bottom vessel. In a separate vessel, a 1.0% aqueous surfactant solution (135 g) was prepared by dissolving the needed amount of 30% CTAC surfactant solution in distilled water. The oil phase was then poured into the aqueous phase and the mixture was homogenized with a high shear mixer (Ultra Turrax T 25 Basic, IKA, Werke). Four drops of defoamer was added to suppress the foaming generated.

Preparation of Diluted Fragrance Emulsion.

Diluted fragrance emulsion was prepared by blending the concentrated fragrance emulsion with the desired amount of water to generate the desired concentration.

Preparation of Silica Capsules.

The amount of precursor added was routinely determined by the wall polymer level needed and was varied from 1% to 30% of the final formulation. In general, the desired amount of precursor, TEOS (39.6 g in this example) and DMDEOS (0.30 g in this example), was weighed out and placed in a clean and dry dropping funnel. The precursor blend (99% TEOS and 0.75% DMDEOS) was then added drop-wise into the diluted fragrance emulsion prepared in step two under constant mixing. Optionally, the DMDEOS was added to the diluted fragrance emulsion and emulsified prior to adding the TEOS. The mixing speed was reduced once the addition of precursor was complete. The mixture was left at room temperature and cured for an extended period of time. The pH of the mixture was maintained at approximately 3 to 4. The capsule formed was well dispersed and generally had a particle size ranging from submicron to one hundred micron depending on the emulsifier and shear rates used.

Preparation of Silica Capsule Slurry with Improved Stability.

To improve stability, thirty grams of the capsule slurry prepared above was weighed out and 0.15 g of CRODAFOS 010A-SS-(RB) emulsifier (oleth-10-phosphate, a complex ester of phosphoric acid and ethoxylated cosmetic grade oleyl alcohol; Croda, Edison, N.J.) was added to it after the CRODAFOS 010A-SS-(RB) was gently heated to its liquid state. The mixture was stirred for approximately 30 minutes via an overhead IKA lab mixer until the surfactant was completely dissolved and homogeneous.

Alternatively, a 10% solution of CRODAFOS 010A-SS-(RB) emulsifier was prepared by dissolving 10 grams of the material in 90 grams under heating. The stabilized capsule slurry was prepared by mixing 570 grams of the fragrance capsule slurry prepared above with 30 grams of the 10% solution of CRODAFOS 010A-SS-(RB) emulsifier under consistent mixing for 30 minutes.

Evaluation of Capsule Stability by Microscopy.

The stability of the capsules was evaluated by diluting the slurry with water. The diluted sample was placed on microscopic slides and monitored overnight. Microscopic analysis indicated that well-formed silica capsules were prepared as fresh sample in water. Some breakage of the capsules was seen after the capsules were dried overnight on a microscopy slide. However, in general, the capsules retained their structural integrity after drying for 3 days in a microscopy slide.

Evaluation of Capsule Slurry Stability.

The slurry stability was evaluated by aging the samples with and without the CRODAFOS 010A-SS-(RB) emulsifier over a period of 4 weeks and photographic pictures were taken to illustrate the stability of the samples. The results of this analysis indicated that there was no separation seen for the capsule slurry prepared with the CRODAFOS 010A-SS-(RB) emulsifier, while samples prepared without CRODAFOS 010A-SS-(RB) emulsifier displayed significant separation, demonstrating the benefit of the phosphate ester.

Example 7: Sensory Performance of Antiperspirant Prepared with Silica Capsules Having Improved Performance and Physical Stability The application benefit of the capsules prepared by with or without the CRODAFOS 010A-SS-(RB) emulsifier in antiperspirant (AP) roll-on base was determined. Fragrance capsule slurry was prepared, where the silica precursor was a mixture of TEOS and DMDEOS. The fragrance used was a Posh Special from IFF. The capsule slurry was dispersed in an AP-roll base at 0.75% neat fragrance equivalent. The base typically contained 1 to 3% anionic surfactant, 10 to 20%, aluminum chlorohydrate, less than 1% silica, 1 to 2% *Helianthus annuus* and water.

Sample Application AP/DEO (Roll-On).

A technician applied 0.35 ml of pre-measured roll on from a syringe directly onto fragrance wearer's upper forearm.

The roll on was then smoothed out evenly over the skin by the technician using a clean glass rod. Eight arms were tested per sample using 15 trained judges. The judges rated the intensity of the product on skin at 5 hours after application under two conditions, prior to activation (pre-rub) and again in post-rubbed condition. For the post-rub evaluation, each wearer gently rubbed the upper forearm up and down to a count of six with two fingers. Judges smelled the top part of the forearm when evaluating the sample. Two-way analysis of variance was conducted with sample and panelists as independent variables and intensity as dependant variable, and again with condition (pre and post) and panelists as independent variables and intensity as dependant variable. Post hoc analysis was by Duncan Multiple Comparison with significance set at 95% CI. The results of this analysis are presented in Table 7.

TABLE 7

| Samples | Pre-rubbing intensity | Post-rubbing intensity | $I_{post}/I_{pre}$ |
|---|---|---|---|
| Posh Special capsules prepared without CRODAFOS 010A-SS-(RB) emulsifier | 5.6 | 7.0 | 1.25 |
| Posh Special capsules prepared with CRODAFOS 010A-SS-(RB) emulsifier | 6.1 | 10.4 | 1.70 |

These results indicate that the capsule prepared with CRODAFOS 010A-SS-(RB) emulsifier had significantly higher post-rubbing intensity. The ratio of $I_{post}/I_{pre}$ also increased by almost 40%. This can lead to greater consumer perceivable intensity, demonstrating the benefit of the instant invention.

Example 8: Sensory Performance of Apple Fragrance Prepared with Silica Capsules Having Improved Performance and Physical Stability This example illustrates the benefits and versatility of the present invention using another fragrance, Apple. The two fragrances, Posh Special and Apple have different physical properties. Capsules containing Apple fragrance were prepared using the process in Example 6 containing the CRODAFOS 010A-SS-(RB) surfactant. The precursors used were TEOS only in one case and a mixture of TEOS/DMDEOS in another. The sensory results of these preparations are listed in Table 8.

TABLE 8

| Sample | Pre-rubbing intensity | Post-rubbing intensity | $I_{post}/I_{pre}$ |
|---|---|---|---|
| Neat fragrance | 7.0 | 7.7 | 1.1 |
| Apple capsules prepared with TEOS as precursor | 7.5 | 12.7 | 1.69 |
| Apple capsules prepared with TEOS/DMDEOS as precursor | 7.7 | 13.1 | 1.70 |

This analysis indicated that the instant capsules can deliver significantly greater post-rubbing intensity and $I_{post}/I_{pre}$ in both cases as compared to neat fragrance.

Example 9: Improvements in Storage Stability

The samples prepared in Example 7 were also tested for their stability at elevated temperature. The samples were aged at 50° C. and the amount of leached fragrance oil was analyzed by a gas chromatograph by sampling the head space concentration. The results of this analysis are given in Table 9.

TABLE 9

| | Leaching (%) | | |
|---|---|---|---|
| Samples | Time zero | 3 days at 50° C. | 6 days at 50° C. |
| Posh Special capsules prepared without CRODAFOS 010A-SS-(RB) emulsifier | <10 | 10.4 | 22.0 |
| Posh Special capsules prepared with CRODAFOS 010A-SS-(RB) emulsifier | <10 | <10 | 12.3 |

These results clearly established the excellent long-term stability of the capsules prepared by the present invention.

What is claimed is:

1. A microcapsule particle composition comprising:
   (a) a core formed from an oil containing at least one active ingredient; (b) a shell encapsulating said core, wherein said shell is composed of
      (i) at least one hydrolyzable silicon oxide polymer, and
      (ii) at least one silicon oxide polymer having a non-hydrolyzable substituent; and
   (c) a surfactant,
   wherein the at least one hydrolyzable silicon oxide polymer is formed from a silicon alkoxide having a formula of $Si(OR)_4$, in which —OR is $C_1$-$C_{18}$ alkoxy or aryloxy group that is hydrolyzable upon dispersion in water, the weight ratio of polymer of (i) to the polymer of (ii) ranges from 199:1 to 9:1, the polymer of (ii) is present in an amount up to 10% of the total weight of the shell, the at least one active ingredient is present in an amount between 50 and 90 weight percent of the microcapsule on a dry basis, and the surfactant is an oleth-10-phosphate present in an amount of 0.1% to 5% by weight of the microcapsule particle composition.

2. The microcapsule particle composition of claim 1, wherein the at least one silicon oxide polymer having a non-hydrolyzable substituent is dimethyldiethoxysilane, n-octylmethyldiethoxysilane, poly(diethoxysiloxane) or hexadecyltriethoxysilane.

3. A personal care, therapeutic, cosmetic or cosmeceutic product comprising the microcapsule particle composition of claim 1.

4. A process for the preparation of the microcapsule particle composition of claim 1 containing an oil core, the process comprising:
   (a) combining, in a sol-gel process:
      (i) an emulsion containing an oil; and
      (ii) a mixture of at least one hydrolyzable sol-gel precursor and at least one sol-gel precursor having at least one non-hydrolyzable substituent, wherein the at least one sol-gel precursor having at least one non-hydrolyzable substituent is present in an amount of up to 10% of the total sol-gel precursor of (ii);
   (b) curing the product of step (a); and
   (c) adding a surfactant to the product of step (b), thereby preparing microcapsule particles containing an oil core, in which the surfactant is an oleth-10-phosphate present in an amount of 0.1% to 5% by weight of the microcapsule particle composition,
   wherein the at least one hydrolyzable sol-gel precursor is a hydrolyzable silicon alkoxide having a formula of Si(OR)$_4$, in which —OR is a C$_1$-C$_{18}$ alkoxy group or aryloxy group that is hydrolyzable upon dispersion in water, the sol-gel precursor having at least one non-hydrolyzable substituent is a silicon oxide precursor having at least one non-hydrolyzable substituent, the weight ratio of the hydrolyzable sol-gel precursor and the sol-gel precursor having at least one non-hydrolyzable substituent ranges from 199:1 to 9:1.

5. The process of claim 4, wherein the oil comprises at least one active ingredient.

6. The process of claim 5, wherein the active ingredient is a fragrance oil.

7. The process of claim 6, wherein the fragrance oil is mixed with an emulsifier.

8. The process of claim 4, wherein the sol-gel precursor having at least one non-hydrolyzable substituent is dimethyldiethoxysilane, n-octylmethyldiethoxysilane, hexadecyltriethoxysilane diethyldiethoxysilane, 1,1,3,3-tetraethoxy-1,3-dimethyldisiloxane, or poly(diethoxysiloxane).

9. The process of claim 4, wherein the silicon alkoxide is tetramethyl orthosilicate, tetraethyl orthosilicate or tetrapropyl orthosilicate.

10. The process of claim 4, wherein the product of step (a) is cured at room temperature.

11. The process of claim 4, wherein the product of step (a) is cured at 30° C. to 70° C.

12. The process of claim 4, wherein the mixture of (ii) is a neat mixture of the at least one hydrolyzable sol-gel precursor and at least one sol-gel precursor having at least one non-hydrolyzable substituent.

13. The process of claim 4, wherein the mixture of (ii) is an emulsion of the at least one hydrolyzable sol-gel precursor and at least one sol-gel precursor having at least one non-hydrolyzable substituent.

14. The process of claim 4, wherein the mixture of (ii) is added drop-wise to the emulsion of (i).

15. A process for the preparation of the microcapsule particle composition of claim 1 containing an oil core, the process comprising:
  (a) mixing, in a sol-gel process
    (i) a first emulsion containing an oil and at least one sol-gel precursor having at least one non-hydrolyzable substituent; and
    (ii) a second emulsion containing at least one hydrolyzable sol-gel precursor, wherein the at least one sol-gel precursor of (i) is present in an amount of up to 10% of the total sol-gel precursor of (i) and (ii);
  (b) curing the mixture; and
  (c) adding a surfactant to the product of step (b), thereby preparing microcapsule particles containing an oil core, in which the surfactant is an oleth-10-phosphate present in an amount of 0.1% to 5% by weight of the microcapsule particle composition,
  wherein the at least one hydrolyzable sol-gel precursor is a hydrolyzable silicon alkoxide having a formula of Si(OR)$_4$, in which —OR is a C$_1$-C$_{18}$ alkoxy group or aryloxy group that is hydrolyzable upon dispersion in water, the sol-gel precursor having at least one non-hydrolyzable substituent is a silicon oxide precursor having at least one non-hydrolyzable substituent, the weight ratio of the hydrolyzable sol-gel precursor and the sol-gel precursor having at least one non-hydrolyzable substituent ranges from 199:1 to 9:1.

16. The process of claim 15, wherein the oil comprises at least one active ingredient.

17. The process of claim 15, wherein the sol-gel precursor of (i) is dimethyldiethoxysilane, n-octylmethyldiethoxysilane, hexadecyltriethoxysilane, diethyldiethoxysilane, 1,1,3,3-tetraethoxy-1,3-dimethyldisiloxane, or poly(diethoxysiloxane).

18. The process of claim 15, wherein the silicon alkoxide is tetramethyl orthosilicate, tetraethyl orthosilicate or tetrapropyl orthosilicate.

19. The process of claim 15, wherein the mixture is cured at room temperature.

20. The process of claim 15, wherein the mixture is cured at 30° C. to 70° C.

21. A process for the preparation of the microcapsule particle composition of claim 1 containing an oil core, the process comprising:
  (a) mixing an oil with
    (i) at least one sol-gel precursor having at least one non-hydrolyzable substituent; and
    (ii) at least one hydrolyzable sol-gel precursor, wherein the at least one sol-gel precursor of (i) is present in an amount of up to 10% of the total sol-gel precursor of (i) and (ii);
  (b) cooling the mixture of (a) to room temperature;
  (c) adding the mixture of (a) to an emulsifier solution to produce a second mixture;
  (d) homogenizing the second mixture of (c) to produce a homogenized mixture;
  (e) adding a defoamer to the homogenized mixture of (d);
  (f) curing the product of (e), and
  (g) adding a surfactant to the product of step (f), thereby preparing microcapsule particles containing an oil or aqueous liquid core, in which the surfactant is an oleth-10-phosphate present in an amount of 0.1% to 5% by weight of the microcapsule particle composition,
  wherein the at least one hydrolyzable sol-gel precursor is a hydrolyzable silicon alkoxide having a formula of Si(OR)$_4$, in which —OR is a C$_1$-C$_{18}$ alkoxy group or aryloxy group that is hydrolyzable upon dispersion in water, the sol-gel precursor having at least one non-hydrolyzable substituent is a silicon oxide precursor having at least one non-hydrolyzable substituent, the weight ratio of the hydrolyzable sol-gel precursor and the sol-gel precursor having at least one non-hydrolyzable substituent ranges from 199:1 to 9:1.

22. The process of claim 21, wherein the oil comprises at least one active ingredient.

23. The process of claim 21, wherein the active ingredient is a fragrance.

24. The process of claim 21, wherein the sol-gel precursor of (i) is dimethyldiethoxysilane, n-octylmethyldiethoxysilane, hexadecyltriethoxysilane, diethyldiethoxysilane, 1,1,3,3-tetraethoxy-1,3-dimethyldisiloxane, or poly(diethoxysiloxane).

25. The process of claim 21, wherein the silicon alkoxide is tetramethyl orthosilicate, tetraethyl orthosilicate or tetrapropyl orthosilicate.

26. The process of claim 21, wherein the mixture is cured at room temperature.

27. The process of claim 21, wherein the mixture is cured at 30° C. to 70° C.

28. A microcapsule particle composition comprising:
  (a) a core formed from an oil or aqueous liquid containing at least one active ingredient; and
  (b) a shell encapsulating said core, wherein said shell is composed of
    (i) at least one hydrolyzable silicon oxide polymer, and
    (ii) at least one silicon oxide polymer having a non-hydrolyzable substituent; and (c) a surfactant, in which the surfactant is an oleth-10-phosphate present in an amount of 0.1% to 5% by weight of the microcapsule particle composition, wherein the polymer of (ii) is present in an amount up to 5% of the total weight of the shell and the microcapsule particle comprises between 50 and 90 weight percent of the at least one active ingredient on a dry basis, wherein the at least one hydrolyzable sol-gel precursor is a hydrolyzable silicon alkoxide having a formula of $Si(OR)_4$, in which —OR is a $C_1$-$C_{18}$ alkoxy group or aryloxy group that is hydrolyzable upon dispersion in water, the sol-gel precursor having at least one non-hydrolyzable substituent is a silicon oxide precursor having at least one non-hydrolyzable substituent, the weight ratio of the hydrolyzable sol-gel precursor and the sol-gel precursor having at least one non-hydrolyzable substituent ranges from 199:1 to 9:1.

29. The microcapsule particle composition of claim 28, wherein the oleth-10-phosphate is present in an amount of 0.1% to 5% by weight of the microcapsule particle composition, and the weight ratio of the hydrolyzable sol-gel precursor and the sol-gel precursor having at least one non-hydrolyzable substituent ranges from 199:1 to 19:1.

30. The microcapsule particle composition of claim 28, wherein the oleth-10-phosphate is present in an amount of 0.1% to 0.2% by weight of the microcapsule particle composition.

31. The microcapsule particle composition of claim 28, wherein the microcapsule particle composition is in the powder form.

32. A consumer product comprising a microcapsule composition of claim 1.

33. The consumer product of claim 32, wherein the consumer product is a personal care product, a personal cleaning product, a shampoo, a hair rinse, a body wash, a soap, an anti-perspirant, a deodorant, a shampoo powder, a deodorant powder, a foot powder, a soap powder, a baby powder, a wash-off product, a laundry product, a powdered detergent, a liquid detergent, a fabric conditioner, a liquid dish detergent, an automatic dish detergent, a dryer sheet, a household cleaning dry wipe, a powder dish detergent, or a floor cleaning cloth.

34. A consumer product comprising a microcapsule particle composition of claim 28.

35. The consumer product of claim 34, wherein the consumer product is a personal care product, a personal cleaning product, a shampoo, a hair rinse, a body wash, a soap, an anti-perspirant, a deodorant, a shampoo powder, a deodorant powder, a foot powder, a soap powder, a baby powder, a wash-off product, a laundry product, a powdered detergent, a liquid detergent, a fabric conditioner, a liquid dish detergent, an automatic dish detergent, a dryer sheet, a household cleaning dry wipe, a powder dish detergent, or a floor cleaning cloth.

* * * * *